US008245884B2

(12) United States Patent
Byeon

(10) Patent No.: US 8,245,884 B2
(45) Date of Patent: Aug. 21, 2012

(54) AIRLESS TYPE COSMETICS VESSEL

(76) Inventor: Jae Sam Byeon, Gyeonggi-Do (KR)

( * ) Notice: Subject to any disclaimer, the term of this patent is extended or adjusted under 35 U.S.C. 154(b) by 471 days.

(21) Appl. No.: 12/581,991

(22) Filed: Oct. 20, 2009

(65) Prior Publication Data

US 2010/0098480 A1 Apr. 22, 2010

(30) Foreign Application Priority Data

Oct. 20, 2008 (KR) ........................ 10-2008-0102597
Mar. 23, 2009 (KR) ........................ 10-2009-0024514
Apr. 22, 2009 (KR) ........................ 10-2009-0035048

(51) Int. Cl.
*G01F 11/00* (2006.01)
*B67D 7/58* (2010.01)

(52) U.S. Cl. ..................... 222/256; 222/380; 222/383.1; 222/375; 222/387; 222/340

(58) Field of Classification Search .................. 222/256, 222/321.3, 321.7, 321.9, 340, 375, 380, 383.1, 222/387
See application file for complete search history.

(56) References Cited

U.S. PATENT DOCUMENTS 4,515,298 A * 5/1985 Czech ........................... 222/380
4,890,773 A * 1/1990 Corsette ........................ 222/380
6,763,978 B2 * 7/2004 Pritchett et al. ............ 222/321.7
7,048,155 B2 * 5/2006 Kuwahara et al. ......... 222/321.9
7,131,559 B2 * 11/2006 Schultz ......................... 222/377
7,654,418 B2 * 2/2010 Law et al. ...................... 222/259
7,780,045 B2 * 8/2010 Rossignol ..................... 222/322
7,934,626 B2 * 5/2011 Choi et al. .................... 222/320
8,038,036 B2 * 10/2011 Bruder et al. ............ 222/189.09
2009/0071985 A1 * 3/2009 Ki ................................ 222/309

FOREIGN PATENT DOCUMENTS

JP 10-120054 5/1998
JP 10-278956 10/1998
JP 10-296141 11/1998

* cited by examiner

*Primary Examiner* — Kevin P Shaver
*Assistant Examiner* — Nicholas Weiss
(74) *Attorney, Agent, or Firm* — Jordan and Hamburg LLP

(57) ABSTRACT

An airless type cosmetics vessel, in which, in order to suck a gel type cosmetic from a vessel body into a cylinder chamber, an axial valve primarily opens an inlet passage and closes an outlet passage according to stepwise upward movement of a piston and an axial valve, and the piston is further moved upwards, thus sucking the cosmetic into the cylinder chamber, and, in order to discharge the cosmetic from the cylinder chamber, the axial valve is primarily moved downwards so as to close the inlet passage and open the outlet passage, and the piston is further moved downwards, thus compressing the cosmetic in the cylinder chamber and discharging the cosmetic from the chamber, so that a precise cosmetic suction and discharge operation can be executed by the stepwise suction and discharge actions of the axial valve and the piston, separately provided, without malfunctioning.

12 Claims, 16 Drawing Sheets

AIRLESS TYPE COSMETICS VESSEL

BACKGROUND OF THE INVENTION

1. Field of the Invention

The present invention relates, in general, to an airless type cosmetics vessel from which a cosmetic can be discharged by the action of pushing and releasing a push button.

More particularly, the present invention relates to an airless type cosmetics vessel, from which can be discharged a cosmetic by the stepwise and continuous actions of a piston and an axial valve without any malfunctions thereof occurring during the discharge of the cosmetic from the vessel body, thus realizing reliability of a product, and which can be precisely operated while the cosmetic is being discharged because of the precise operation of a control nozzle, thus realizing operational precision and being convenient for users, and a discharge port of the nozzle of which can automatically be closed after the cosmetic has been discharged therefrom, thus preventing leakage of the cosmetic and allowing the users to safely carry the cosmetics vessel, thereby preventing the cosmetics from becoming contaminated and the quality of the cosmetic from being changed.

2. Description of the Related Art

Generally, a conventional airless type cosmetics vessel discharges a liquid (gel) cosmetic from a vessel body by operation of a pumping mechanism, the pumping mechanism being installed in a cap mounted to an upper end of the vessel body and being moved downwards by an action of a push button so as to discharge the cosmetic from the cylinder.

Airless type cosmetics vessels have been typically classified into two types.

A first type of cosmetics vessel is provided with a movable discharge port (a movable nozzle). To operate the vessel, a cap (functioning as a push button) having the discharge port therein is moved downwards, thus moving the discharge port and discharging a cosmetic from a pumping mechanism.

A second type of cosmetics vessel is provided with a fixed discharge port (fixed nozzle). To operate the vessel, a push button, which is placed next to the fixed discharge port and is movable separately from the fixed discharge port, is pushed downwards, so that a pumping mechanism is operated in conjunction with the push button, thus sucking a cosmetic therein and discharging the cosmetic therefrom through the fixed nozzle.

The movable nozzle (movable discharge port) type of cosmetics vessel is problematic in that the discharge port (nozzle) is movable upwards and downwards, so that it is almost impossible to apply a gel type cosmetic onto a precise location on the skin.

The fixed nozzle type of cosmetics vessel is advantageous in that, even when the push button is pushed downwards, the nozzle (discharge port) for discharging the gel type cosmetic does not move, so that it is possible to apply the cosmetic to a desired area on the skin without ever failing.

The present invention relates to the fixed nozzle type of cosmetics vessels.

An example of the fixed nozzle type of cosmetics vessels is an “ejection container” disclosed in Japanese Unexamined Patent Publication No. Hei 10-120054 (published on May 12, 1998 and, hereinbelow, referred to simply as “related art 1”).

Related art 1 discloses a container, in which a fluid is compressed by a pump means installed in an outer container and compresses an inner container, thus discharging contents from the chamber of the inner container through an ejection port. Therefore, the container disclosed in the related art 1 is problematic in that the inner container must be made of a compressible material and the space defined between the inner container and the outer container must be sealed, and a check valve structure for maintaining the fluid compression force formed by the pump means and for preventing an undesired introduction of air into the inner container in a normal state must be provided, so that the ejection container has a complicated structure.

Further, Japanese Unexamined Patent Publication No. Hei 10-278956 (published on Oct. 20, 1998) discloses a “liquid discharging container” (hereinbelow, referred to simply as “related art 2”).

Related art 2 is configured such that a liquid can be sucked and discharged both by a first elastic valve cylinder having a suction valve at the lower end of a first leg cylinder, which is vertically movable in contact with the inner circumferential surface of a small-diameter cylinder, and by a second elastic valve cylinder having a discharge valve at the lower end of a second leg cylinder, which is vertically movable and is in contact with the inner circumferential surface of a large-diameter cylinder and the outer circumferential surface of the small-diameter cylinder. Thus, when the container is repeatedly used over a lengthy period of time, the container may be deformed and watertightness thereof may be reduced, thus reducing the amount of liquid discharged therefrom.

Particularly, in the liquid discharging container, the liquid, which has been pumped up by a central pumping pipe, is discharged through a nozzle after having passed through the first and second leg cylinders of a top plate and the inner and outer circumferential surfaces of the small-diameter cylinder in a zigzag passing pattern. Thus, the container is problematic in that the top plate is overloaded by pressure, so that a user must push the top plate with a large force when pushing the top plate with a hand.

Further, Japanese Unexamined Patent Publication No. Hei 10-296141 (published on Nov. 10, 1998) discloses a “pump dispenser” (hereinbelow, referred to simply as “related art 3”).

Related art 3 is problematic in that an airtight piece, which protrudes from the upper end of an inner pipe of a pressing body so as to vertically move inside a nozzle pipe in an airtight state, is easily abraded, thus causing contents to leak through a space between the airtight piece and an outer pipe. Further, movement of an axial center of the pressing body is supported only by an annular protrusion provided in the upper portion of the inner surface of an outer cylinder, so that a large space is required to be provided in order to allow the axial center to move. The large space easily causes eccentric movement of the axial center of the pressing body and causes eccentric abrasion of the pressing body, thus reducing the life span of the pump dispenser.

Further, Korean Utility Model registration No. 20-311496 discloses a “dispenser vessel” (hereinbelow, referred to simply as “related art 4”).

As shown in FIG. 1 of the accompanying drawings, related art 4 is configured such that a pumping stem 44 coupled to a push button 70 is moved in a vertical direction so as to open and close a check valve 30 of a cylinder 20, so that a gel type cosmetic can be discharged from the vessel through a nozzle 62 of a discharge head 60 after having passed through a central passage defined in the pumping stem 44.

However, the related art 4 is problematic in that the push button 70 is eccentrically coupled to the pumping stem 44, so that a finger operating space defined in the top of the vessel at a location around the push button 70 is too narrow. Thus, a user may not apply a pushing force to the push button 70 which is strong enough to realize the desired pumping action of the push button 70 and discharge the cosmetic from the vessel. Further, the pumping stem 44 is moved upwards and downwards by a pushing action of the push button 70, which is eccentric from the axis "O" of the pumping stem 44, so that the pumping stem 44 may not execute precise movement along the axis thereof. Thus, when the pumping stem 44 repeatedly executes the eccentric upward and downward movement over a lengthy period of time, an eccentric abrasion may be formed in the pumping stem and cause the cosmetic to leak through the eccentrically abraded part of the pumping stem 44. Further, due to the eccentric arrangement of the push button 70 relative to the pumping stem 44, an eccentric load acts on the junction between the pumping stem 44 and the push button 70, so that the junction may be easily deformed. In the above state, the push button 70 may create noises during the pushing operation and may fail to execute a smooth pushing action.

Further, in related art 4, when the piston rod 40 and the pumping stem 44 are moved upwards, the gel type cosmetic can be sucked into the cylinder 20 by an action of the check valve 30. When the piston rod 40 and the pumping stem 44 are moved downwards, the cosmetic flows upwards both through an outlet port 42 of the piston rod 40 and through the central passage of the pumping stem 44 prior to being discharged from the vessel through the nozzle 62. Thus, related art 4 is problematic in that a high pushing pressure must be applied to the push button and furthermore because a return spring 24 of the check valve 30, as a result of being repeatedly compressed in a state in which the cosmetic has been sucked into and contained in the cylinder 20, may lose elasticity, so that the spring 24 may fail to elastically move the push button 70 upwards and the operational reliability of the product is reduced.

Further, in the same manner as was described in related arts 1, 2 and 3, related art 4 is configured such that the sucked cosmetic must be pumped upwards through the central passage of the pumping stem 44 according to a downward moving distance of the piston rod 40 and the pumping stem 44, prior to being discharged from the vessel. Thus, a high pushing force must be applied onto the piston rod 40 and the pumping stern 44 in order to discharge the cosmetic.

In an effort to solve the problem of related art 4, Korean. Unexamined Patent Publication No. 2009-40633 (published on Apr. 27, 2009) discloses a "pump for liquid cosmetic receptacle" (hereinbelow, referred to simply as "related art 5").

As shown in FIG. 2 of the accompanying drawings, related art 5 comprises a pump body 10 having a cylinder 11 and a discharge passage 14*a*, and a valve body 30 having an inner valve part 32 and an outer valve part 35. The inner and outer valve parts 32 and 35 oppositely open and close respective passages according to an operation of a pump piston 22, which is operated in conjunction with the operation of a push button 23.

In the related art 5, the pump piston 22 coupled to the push button 23 is provided with a sealing skirt part functioning as a piston, so that the cosmetic can be sucked into an intermediate storage chamber (cylinder chamber) 11*b* of the cylinder 11 by upward movement of the pump piston 22 and can be discharged from the cylinder chamber by compressing the cylinder 11.

When the push button 23 in the related art 5 is pushed downwards, the valve body 30 and the pump piston 22 are simultaneously moved downwards, so that the inner valve part 32 closes a cosmetic inlet port 34 formed in the lower end of the cylinder chamber (intermediate storage chamber) 11*b*. Further, in the above state, the discharge passage 14*a*, which was closed by the outer valve part 35, is opened and the cosmetic is discharged under pressure from the cylinder chamber 11*b* through the nozzle hole of a nozzle 14.

Described in brief, when the pump piston 22 in related art 5 is elastically moved upwards by a restoring spring 24, the cosmetic contained in a vessel body 201 is sucked into the cylinder chamber 11*b*. When the pump piston 22 is pushed downwards and compresses the cylinder chamber 11*b*, the cosmetic can be discharged under pressure from the cylinder chamber 11*b* through the nozzle 14.

However, related art 5 is problematic in that, during upward movement of the pump piston 22, a suction force is applied both to the cosmetic contained in the discharge passage 14*a* and to the cosmetic contained in the vessel body 201 within a time interval between the time the discharge passage 14*a* is closed by the outer valve part 35 and the time the cosmetic inlet port 34 of the inner valve part 32 opens. Further, during downward movement of the pump piston 22, a compression force for discharging the cosmetic is applied both to the cosmetic in the discharge passage 14*a* and to the cosmetic in the vessel body 201 within a time interval between the time of closing the cosmetic inlet port 34 by the inner valve part 32 and the time the discharge passage 14*a* by the outer valve part 35 opens. In other words, even when the push button 23 is pushed downwards and is elastically moved upwards, the pump of related art 5 cannot execute a precise cosmetic suction and discharge operation.

Brief described, related art 5 is problematic in that the action of the push button 23 cannot realize a precise cosmetic suction and discharge operation, so that it is almost impossible to use related art 5 practically.

Further, related art 5 is not provided with a safety unit for preventing the cosmetic from leaking through the discharge passage after the gel type cosmetic has been discharged through the discharge port (nozzle), so that, when the cosmetic vessel is carried in a handbag by a user after having used the vessel, the gel type cosmetic may be discharged from the discharge passage, thus contaminating both the interior of the handbag and the interior of the cosmetic vessel.

Further, Korean Utility Model Registration No. 20-282746 (registered on Jul. 23, 2002 and, hereinbelow, referred to simply as "related art 6") discloses an "apparatus for opening and shutting nozzle of cosmetic case", in which, after a gel type cosmetic has been discharged through a nozzle, the discharge port of the nozzle is closed, thus realizing safe carrying of the cosmetics vessel.

The related art 6 proposes a nozzle control means, which comprises a spring-biased tip valve provided in a nozzle pipe having a nozzle hole such that the tip valve is normally biased forwards by a spring. To operate, a cosmetic is compressed by actuating a push button and then flows under pressure into the nozzle pipe, thus compressing the spring, which has elastically biased the tip valve forwards and has closed the nozzle hole. When the spring is compressed backwards, the tip valve is moved backwards and opens the nozzle hole.

However, related art 6 is problematic in that the spring used for elastically biasing the tip valve is a metal compression spring, so that the cosmetic is in contact with the metal spring, thus causing the quality of the cosmetic to change. Further, when the apparatus is repeatedly used over a lengthy period of time, the thin metal spring may lose elasticity and be made to malfunction. In the above state, the spring fails to reliably open or close the nozzle hole.

Further, related art 6 uses a movable nozzle instead of a fixed nozzle and is configured such that the nozzle pipe moves in conjunction with the operation of the push button and discharges the cosmetic. Thus, the apparatus of related art 6 may fail to discharge the cosmetic onto a precise area of the skin of a user.

Particularly, in related art 6, the cosmetic, which was compressed by the action of the push button, flows upwards through a narrow outlet passage defined between the piston and the piston valve, and the spring is compressed backwards by the pressure of the cosmetic, thus opening the nozzle hole and discharging the cosmetic through the nozzle pipe. Therefore, a strong pushing force must be used on the push button of related art 6, thus reducing the operational reliability of the apparatus.

SUMMARY OF THE INVENTION

Accordingly, the present invention has been made keeping in mind the above problems occurring in the related art, and the present invention is intended to propose an airless type cosmetics vessel, in which, in order to suck a gel type cosmetic from a vessel body into a cylinder chamber, an axial valve primarily opens an inlet passage and closes an outlet passage according to stepwise upward movement of a piston and an axial valve, and the piston is further moved upwards, thus sucking the cosmetic into the cylinder chamber, and, in order to discharge the cosmetic from the cylinder chamber, the axial valve is primarily moved downwards so as to close the inlet passage and open the outlet passage, and the piston is further moved downwards, thus compressing the cosmetic in the cylinder chamber and discharging the cosmetic from the chamber, so that a precise cosmetic suction and discharge operation can be executed by the stepwise suction and discharge actions of the axial valve and the piston, separately provided, without malfunctioning.

Further, the present invention is intended to propose an airless type cosmetics vessel, in which a discharge port of a nozzle pipe is opened by action of a control nozzle operated in conjunction with downward movement of a push button, thus discharging the gel type cosmetic, and, after the cosmetic has been discharged, the discharge port of the nozzle pipe closing in response to a restoring action (upward movement) of the push button, thus preventing the remaining cosmetic from leaking through a discharge cap and preventing contamination of a handbag or contamination of the cosmetic remaining in the cosmetics vessel while the cosmetics vessel is being carried by a user, and which does not use a metal spring, thus preventing changing the quality of the cosmetic, and which can reliably close the discharge port of the nozzle pipe, thus realizing the desired reliability of a product.

In order to achieve the above objects, according to one aspect of the present invention, there is provided an airless type cosmetics vessel, in which the axial valve and the piston, operated in conjunction with an action of the push button, are stepwisely moved in vertical directions, so that a gel type cosmetic can be sucked into the cylinder chamber and can be discharged under pressure from the cylinder chamber through the nozzle pipe of the control nozzle.

In an embodiment, the present invention provides an airless type cosmetics vessel comprising: a discharge cap mounted to the vessel body and defining a discharge passage therein and receiving a control nozzle in the discharge passage, a push button placed in the discharge cap so as to move upwards and downwards and elastically biased upwards by a compression spring, a cylinder mounted to the discharge cap, a piston unit axially connected to the push button and being movable upwards or downwards so as to suck a cosmetic from the vessel body into the cylinder and to discharge the cosmetic from the cylinder through the discharge passage, and a cylinder bushing mounted to the discharge cap and receiving the cylinder therein and defining a guide passage communicating with the discharge passage and having a cosmetic inlet port in a lower end thereof, wherein the discharge cap comprises: an outer cap part and an inner cap part placed inside the outer cap part, wherein the outer cap part includes: a button seat formed in an upper portion of the upper cap part; a coupling pipe extending downwards through the button seat; and a nozzle installation hole formed through the button seat in a horizontal direction; and the inner cap part includes: a threaded pipe part mounted to the coupling pipe of the outer cap part; a support piece part extending upwards from a part of an upper end of the threaded pipe part and passing through and assembled with the button seat such that the support piece part is in close contact with an inner surface of the nozzle installation hole, the support piece part being hollow and having the discharge passage communicating with an interior of the threaded pipe part, with an airtight nozzle hole formed through the support piece part such that the airtight nozzle hole reaches the button seat and is aligned with the nozzle installation hole; and an axial guide pipe extending downwards from a horizontal end plate of the threaded pipe part; the control nozzle installed both through the nozzle installation hole and through the airtight nozzle hole such that the control nozzle reaches the button seat; and the piston unit comprises: a piston rod connected to the coupling pipe coupled to the push button; and a piston coupled to the piston rod and moved upwards and downwards between the coupling pipe and the piston rod, wherein the piston rod movably receives therein an axial valve, the axial valve comprising a valve stem and a valve body provided at a lower end of the valve stem so as to open or close a guide passage, wherein when the push button is moved upwards, the axial valve is primarily moved upwards, so that the valve body closes the guide passage and, at the same time, opens the cosmetic inlet port of the cylinder bushing, and the piston rod is secondarily moved upwards, thus sucking the cosmetic into a cylinder chamber; and when the push button is pushed downwards, the axial valve is moved downwards, so that the valve body closes the cosmetic inlet port of the cylinder bushing and opens the guide passage, and the piston rod is secondarily moved downwards, so that the piston coupled to the piston rod compresses the cylinder chamber and the cosmetic is discharged from the cylinder chamber through the discharge passage after passing through the guide passage and the discharge passage.

Thus, the present invention can suck from the vessel body into the cylinder chamber and discharge the cosmetic from the cylinder chamber without malfunction.

In the present invention, the control nozzle opens the discharge port of the nozzle pipe in response to downward movement (a compressing action) of the push button, thus discharging the cosmetic from the cylinder chamber under pressure, and the discharge cap automatically prevents the cosmetic from leaking through the discharge passage and the nozzle pipe in response to upward movement (a restoring action) of the push button.

In other words, the control nozzle of the present invention is configured such that, in response to downward movement (the compressing action) of the push button coupled to the control rod installed inside the nozzle pipe, the control rod is guided along the guide slot of the push button and is forcibly moved backwards, thus opening the discharge port of the nozzle pipe, and, in response to upward movement (the restoring action) of the push button, the control rod is guided along the guide slot of the push button and is forcibly moved forwards, thus closing the discharge port of the nozzle pipe, so that the control rod can prevent contact from being made with the air and leakage of the remaining cosmetic through either of the discharge passage of the discharge cap or the nozzle pipe after using the vessel, thus realizing safe carrying of the cosmetics vessel by a user and preventing the quality of the cosmetic from changing.

The airless type cosmetics vessel according to the present invention is advantageous in that the axial valve and the piston are stepwisely moved in a vertical direction in response to vertical movement of the push button, thus primarily opening or closing the guide passage defined between the cylinder and the cylinder bushing, and the piston is secondarily moved in the same direction, thus realizing precision sucking of the cosmetic from the vessel body into the cylinder chamber and precision discharging of the cosmetic from the cylinder chamber without malfunctions, thereby providing a product having high operational reliability.

Further, when the cosmetics vessel is being carried by a user after having been used, the discharge cap prevents the cosmetic from leaking out of the discharge passage or the nozzle pipe and prevents the cosmetic from making contact with the air. Therefore, the present invention is advantageous in that it is possible to prevent contamination of a bag having the vessel therein and prevent a change in quality of the cosmetic.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

The present invention is characterized as follows. When a push button is moved upwards to suck a cosmetic, a piston, which is axially and movably coupled to an axial valve, primarily closes a guide passage defined between a cylinder and a cylinder bushing. When the axial valve is moved upwards in a state in which a cosmetic inlet port of the cylinder bushing is opened, the piston is secondarily moved upwards and sucks the cosmetic into the cylinder.

When the push button is pushed downwards to discharge the cosmetic, the axial valve primarily opens the guide passage defined between the cylinder and the cylinder bushing. When the axial valve is moved downwards in a state in which the cosmetic inlet port of the cylinder bushing is closed, the piston is secondarily moved downwards, thus compressing the cosmetic in the cylinder chamber and discharging the cosmetic from the cylinder chamber. Therefore, the cosmetics vessel of the present invention precisely realizes the operation of discharging a cosmetic.

Further, the nozzle pipe of the control nozzle can be opened or closed in conjunction with vertical movement of the push button so as to discharge the cosmetic, so that it is possible to prevent the cosmetic from undesirably flowing out of the nozzle pipe after use and to prevent the cosmetic from coming into contact with the air, thus preventing the quality of the cosmetic from changing. Even when the cosmetics vessel of the present invention is repeatedly used over a lengthy period of time, the control nozzle executes a precise operation.

The embodiment and construction of the present invention shown in the accompanying drawings will be described for illustrative purposes.

Those skilled in the art will appreciate that various modifications, additions and substitutions are possible, without departing from the scope and spirit of the invention as disclosed in the accompanying claims.

Hereinbelow, the construction and operation of an embodiment of the present invention will be described in detail with reference to the accompany drawings.

Figure 1:
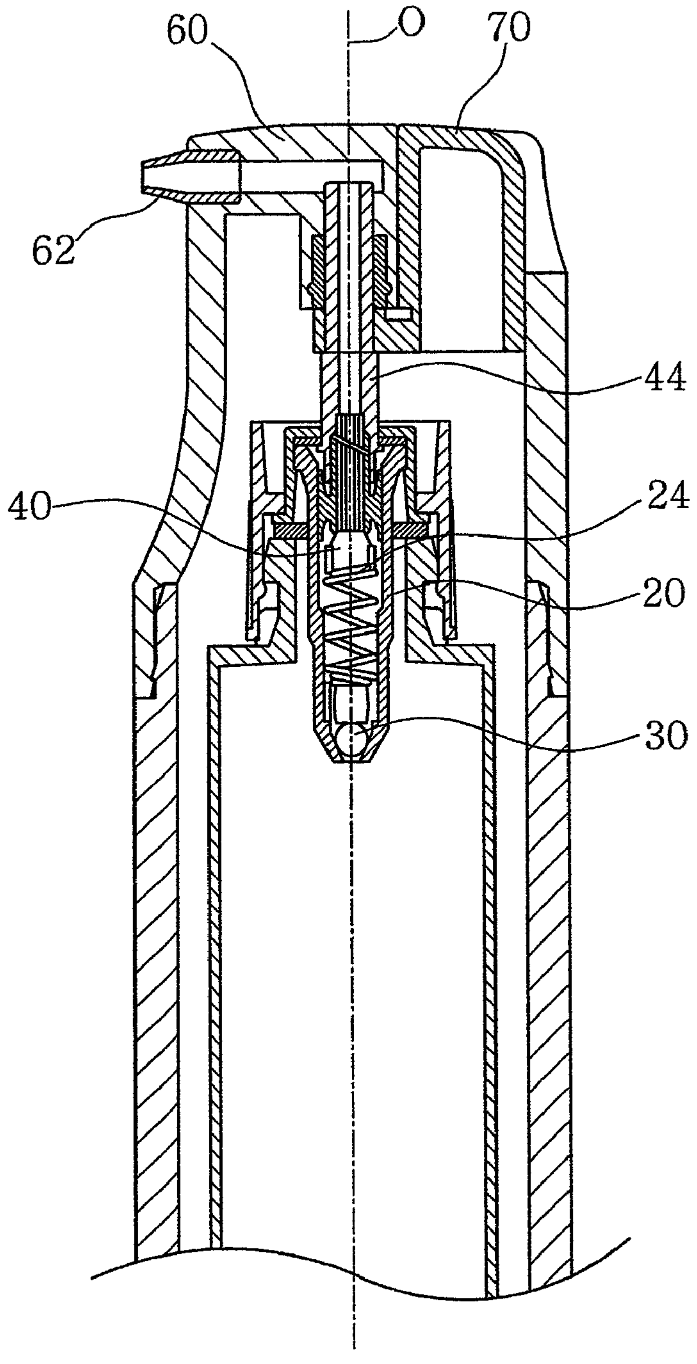
FIG. 1 PRIOR ART
FIG. 1 is a sectional view showing the construction of an airless type cosmetics vessel according to the related art.
Figure 2:
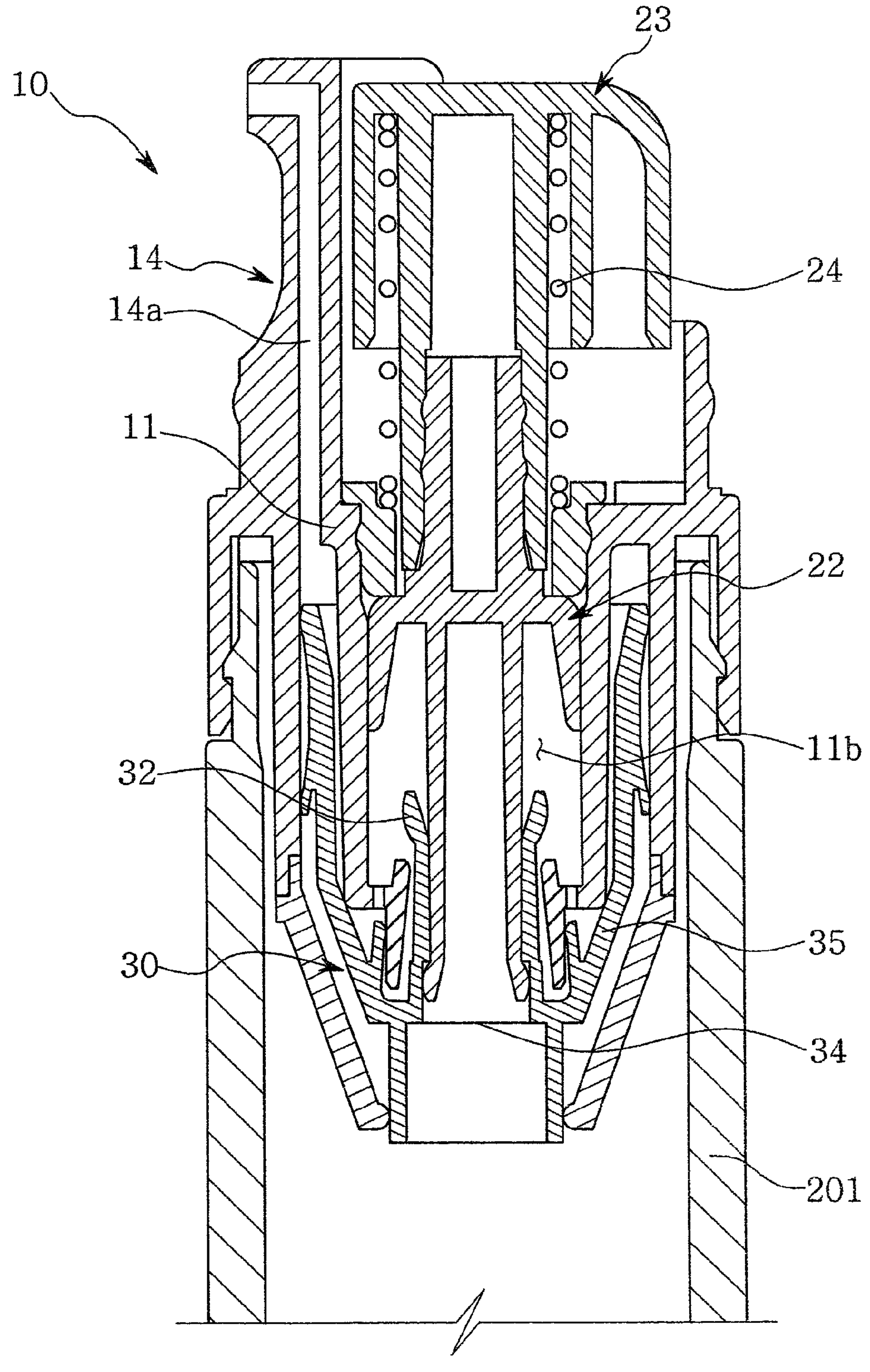
FIG. 2 PRIOR ART
FIG. 2 is a sectional view showing the construction of another airless type cosmetics vessel according to the related art.
Figure 3:
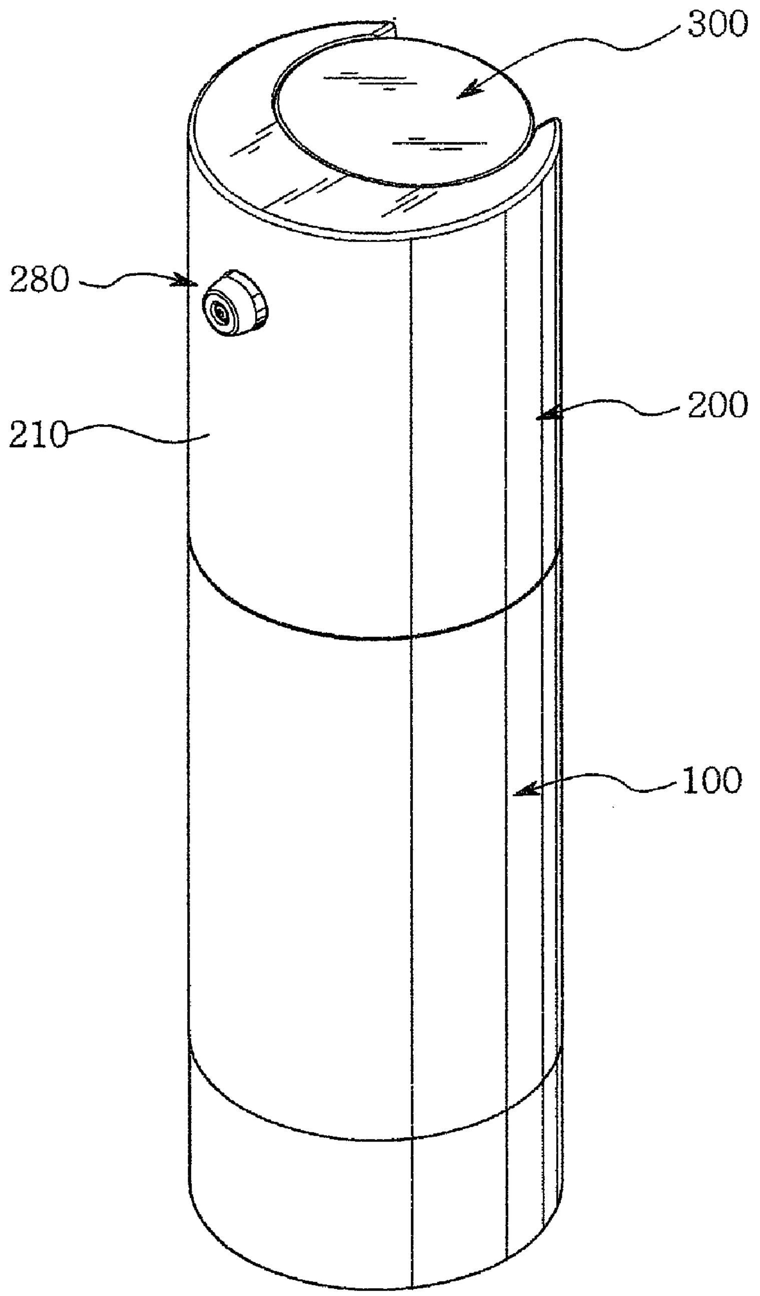
FIG. 3 is a perspective view showing the appearance of an airless type cosmetics vessel according to the present invention.
Figure 4:
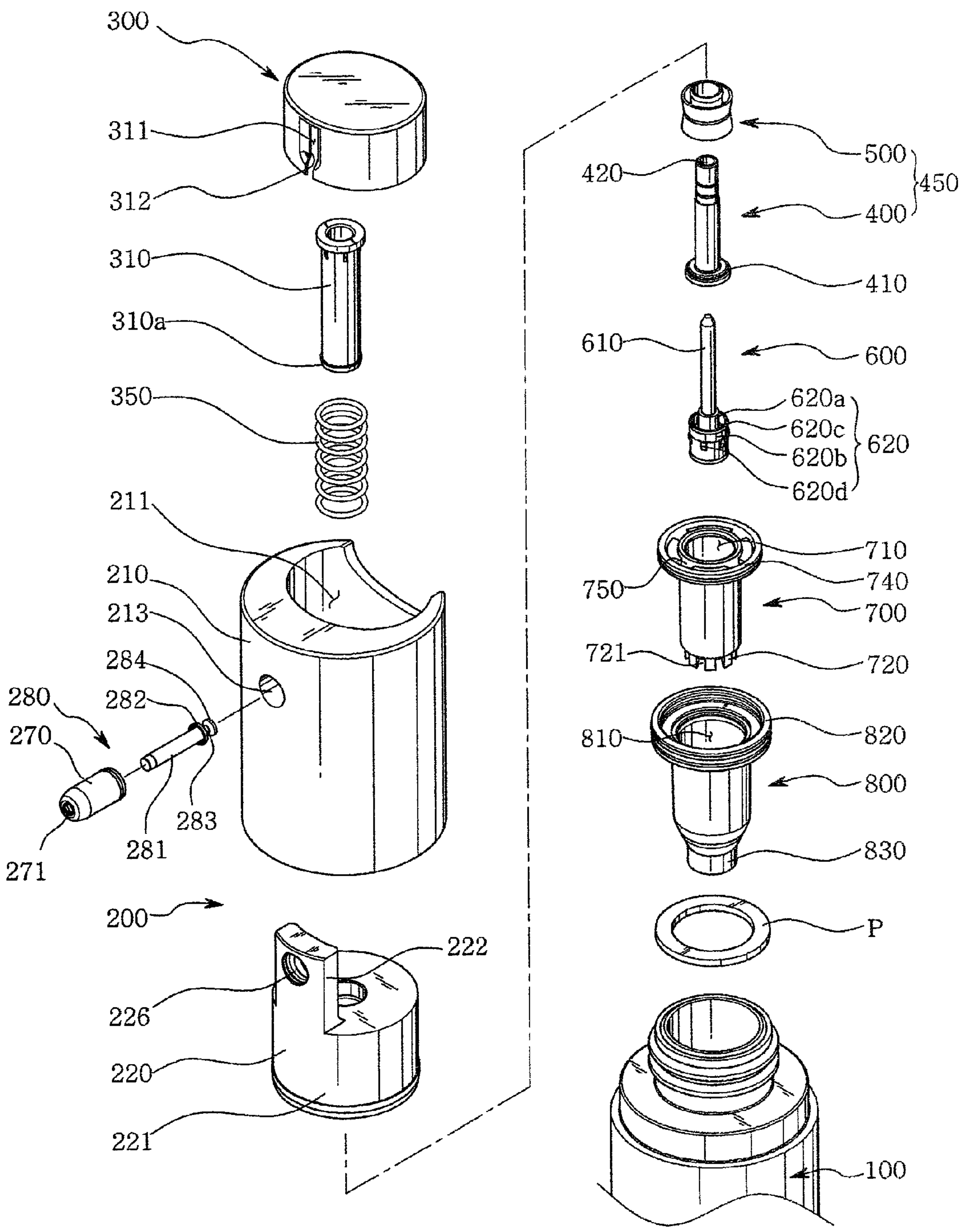
FIG. 4 is an exploded perspective view of the airless type cosmetics vessel according to the present invention.

FIG. 3 is a perspective view showing the appearance of an airless type cosmetics vessel according to the present invention. FIG. 4 is an exploded perspective view of the cosmetics vessel of the present invention.

As shown in FIG. 4, the airless type cosmetics vessel the present invention comprises a vessel body 100 containing a gel type cosmetic therein, a discharge cap 200 mounted to the vessel body 100, a control nozzle 280 installed in the discharge cap 200 in a horizontal direction so as to communicate with a discharge passage 225 of the discharge cap 200, a push button 300 movably installed in the discharge cap 200 and actuating the control nozzle 280, a piston unit 450 including a piston rod 400 connected to the push button 300 and a piston 500 coupled to the piston rod 400, an axial valve 600 axially coupled to the piston rod 400 and executing frictional movement relative to the piston rod 400, a cylinder 700 defining a cylinder chamber 710 therein with the piston 500 and the axial valve 600 received in the chamber 710, and a cylinder bushing 800 fitted over the cylinder 700.

Figure 5:
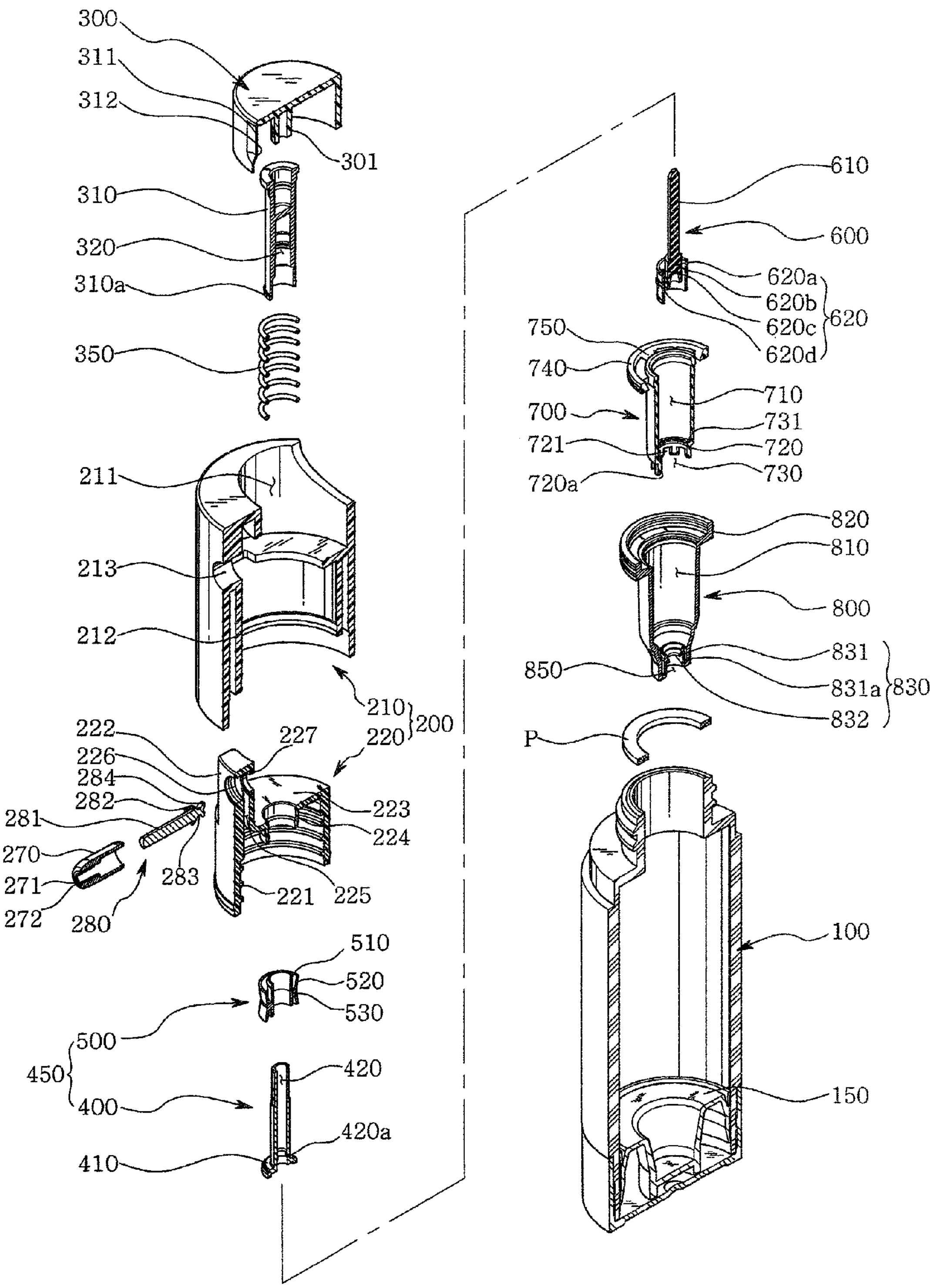
FIG. 5 is an exploded, sectioned perspective view of the airless type cosmetics vessel according to the present invention.
Figure 8:
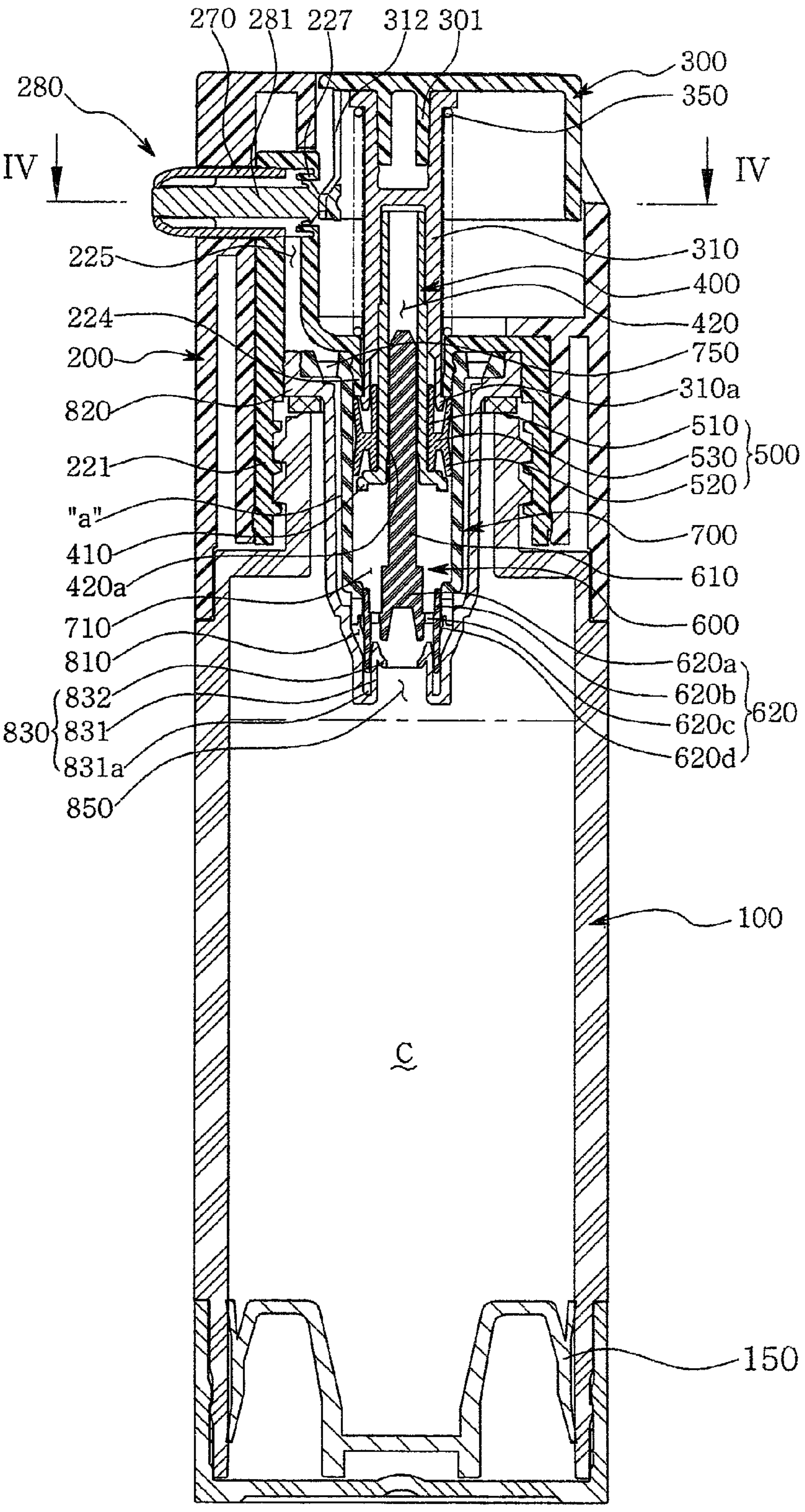
FIG. 8 is a sectional view showing the assembled airless type cosmetics vessel according to the present invention in an initial state before suction of a cosmetic into a cylinder chamber or in a state in which the cosmetic has sucked into the cylinder chamber by downward movement and restoring action (upward movement) of a push button.

FIG. 5 is an exploded, sectioned perspective view of the airless type cosmetics vessel according to the present invention. FIG. 8 is a sectional view showing the assembled cosmetics vessel of the present invention in an initial state before the suction of a cosmetic into the cylinder chamber or in the state in which the cosmetic has moved into the cylinder chamber by downward movement and restoring action (upward movement) of the push button.

The vessel body 100 is provided with a vacuum piston 150 on an inner surface of the bottom thereof. When a gel type cosmetic contained in the vessel body 100 is pumped up by compressing (a downward movement) and releasing (an upward movement) the push button 300, the vacuum piston 150 is moved upwards so as to reduce the interior volume of the vessel body 100 in response to the amount of cosmetic which moved into the cylinder chamber 710 of the cylinder 700. The construction and operation of the vacuum piston 150 is well known to those skilled in the art and further explanation is thus not deemed necessary.

Figure 6:
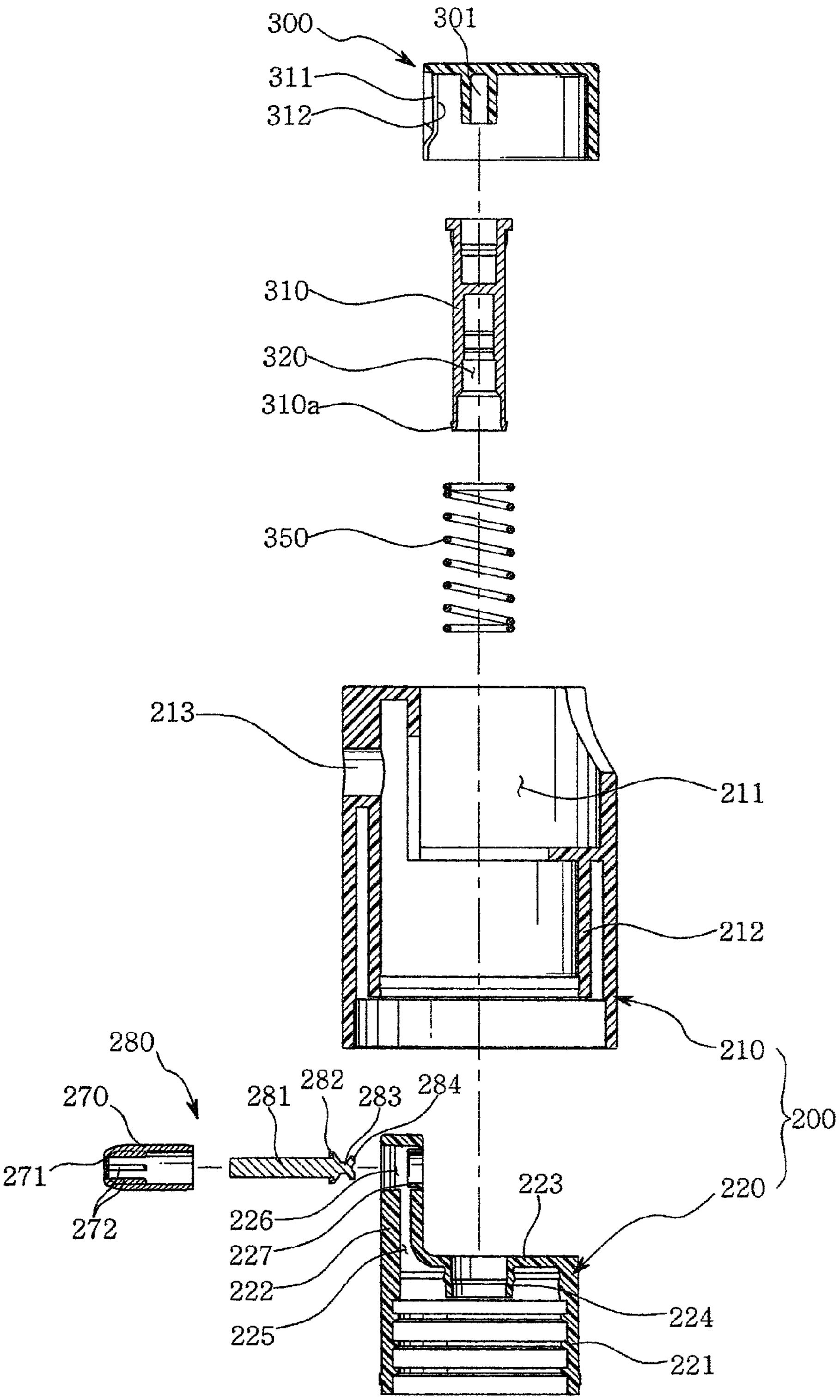
FIG. 6 is an exploded sectional view of a discharge cap and a push button constituting the airless type cosmetics vessel according to the present invention.
Figure 7:
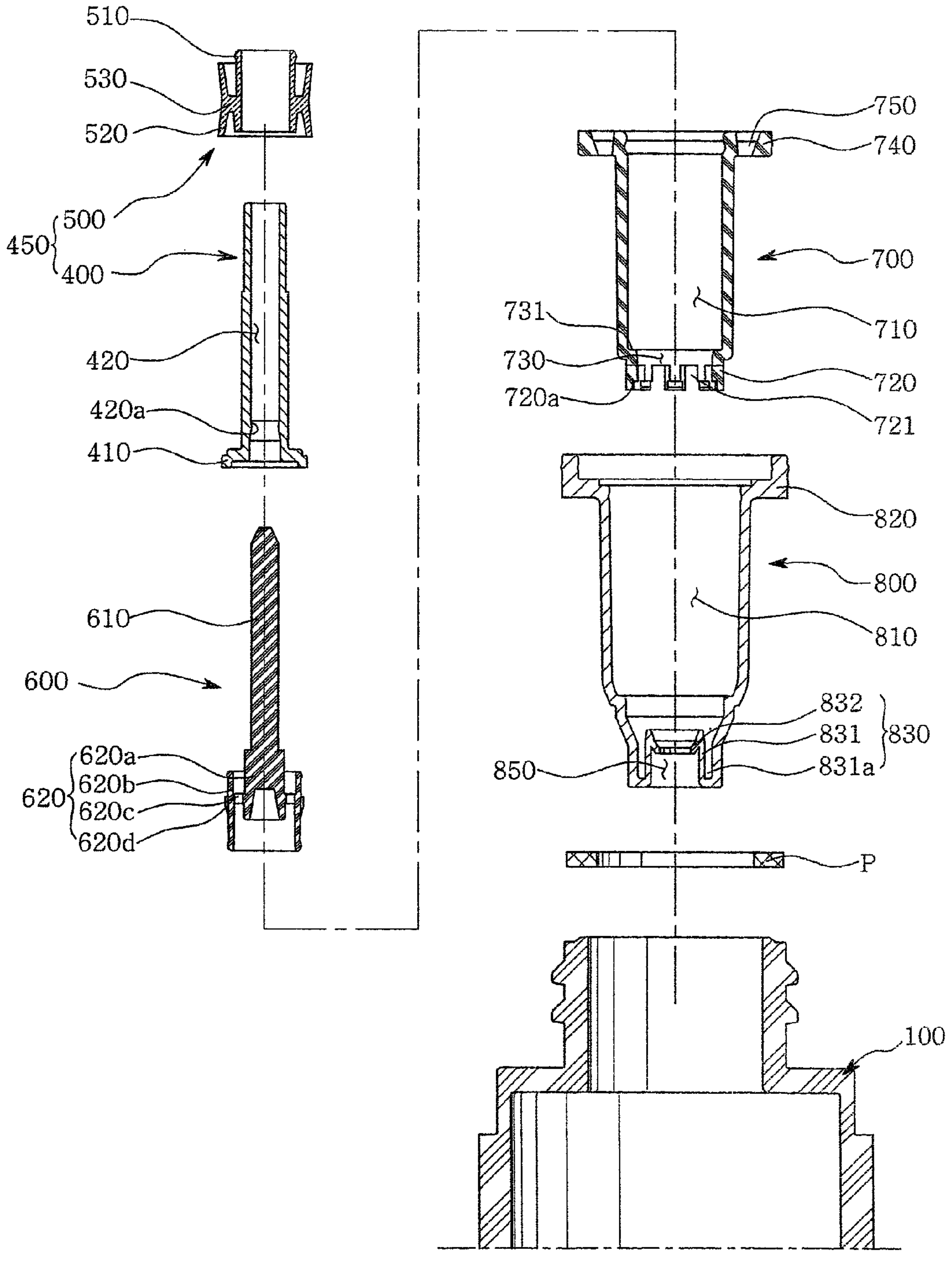
FIG. 7 is an exploded sectional view of a piston, a piston rod, an axial valve, a cylinder and a cylinder bushing constituting the airless type cosmetics vessel according to the present invention.

FIG. 6 is an exploded sectional view of the discharge cap and the push button constituting the airless type cosmetics vessel according to the present invention. The discharge cap 200 comprises an outer cap part 210 and an inner cap part 220 provided inside the outer cap part 210.

The outer cap part 210 includes a button seat 211 in an upper portion thereof, a coupling pipe 212 extending downwards through the button seat 211 and a nozzle installation hole 213 formed through the button seat 211 in a horizontal direction.

The inner cap part 220 includes a threaded pipe part 221 securely mounted to the coupling pipe 212 of the outer cap part 210, and a support piece part 222 extending upwards from a part of the upper end of the threaded pipe part 221 and passing through and assembled with the button seat 211 such that the support piece part 222 is in close contact with the inner surface of the nozzle installation hole 213, Here, the threaded pipe part 221 is provided with internal threads on an inner circumferential surface thereof and is tightened to the externally threaded mouth of the vessel body 100 at the internal threads. An axial guide pipe 224 extends downwards from a horizontal end plate 223 of the threaded pipe part 221.

Further, the support piece part 222 is configured as a hollow piece having a discharge passage 225 communicating with the interior of the threaded pipe part 221. An airtight nozzle hole 226 is formed through the support piece part 222 such that the nozzle hole 226 reaches the button seat 211 and is aligned with the nozzle installation hole 213.

Here, the airtight nozzle hole 226 is provided with an elastic ring 227, which protrudes from the rear portion of the inner circumferential surface of the nozzle hole 226.

In the discharge cap 200, the control nozzle 280 is installed both through the nozzle installation hole 213 of the outer cap part 210 and through the airtight nozzle hole 226 of the inner cap part 220 such that the nozzle 280 reaches the button seat 211.

Figure 9:
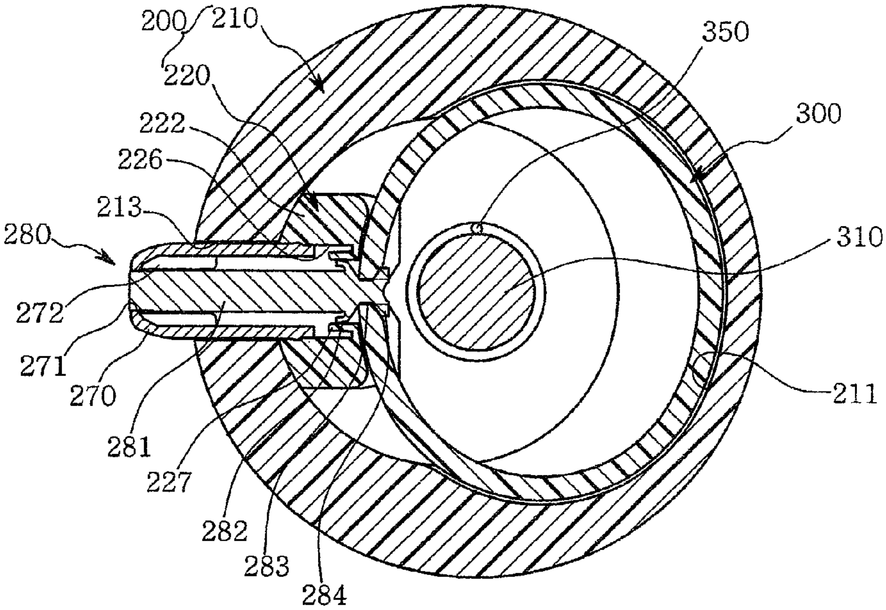
FIG. 9 is a sectional view taken along line IV-IV of FIG. 8.
Figure 10:
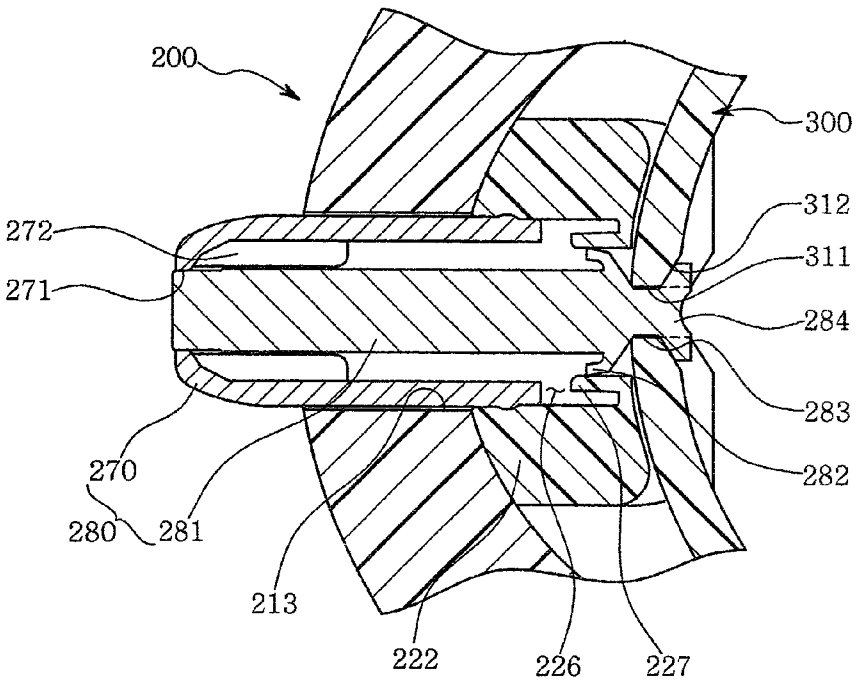
FIG. 10 is an enlarged sectional view of a part of FIG. 9.

As shown both in the sectional view of FIG. 9 and in the enlarged view of FIG. 10, the control nozzle 280 comprises an outer nozzle pipe 270 installed through the nozzle installation hole 213 and the airtight nozzle hole 226. A control rod 281 is movably received in the nozzle pipe 270 such that the rod 281 passes through the airtight nozzle hole 226 so as to reach the button seat 211 and can axially move forwards and backwards, thus opening or closing the discharge port 271.

The nozzle pipe 270 is provided with a plurality of radial guide pieces 272 around the inner circumferential surface thereof at positions near the discharge port 271, thus supporting the front portion of the outer circumferential surface of the control rod 281 and realizing stable axial movement of the control rod 281.

Further, the control rod 281 comprises an elastic seal ring 282, which is formed at a rear portion thereof spaced apart by a predetermined distance from the front end that comes into contact with the inner circumferential surface of the discharge port 271, a connection part 283 extending from the seal ring 282 and having a small diameter, and a contact ring 284 connected to the rear end of the connection part 283.

The seal ring 282 is closely fitted into the elastic ring 227 of the airtight nozzle hole 226, thus sealing the junction between the button seat 211 and the discharge passage 225 during movement of the control rod 281. The seal ring 282 and the contact ring 284 have respective inclined surfaces, which are inclined upwards in opposite directions from the connection part 283.

The control rod 281 is installed in the nozzle pipe 270 in a state in which the front end of the rod 281 is in close contact with and closes the discharge port 271 and both the connection part 283 and the contact ring 284 are projected into the button seat 211.

As shown in the exploded sectional view of FIG. 6, an end of a coupling pipe 310 is closely fitted over a fitting pipe 301 of the push button 300. As shown in the sectional view of FIG. 8, the coupling pipe 310 is movably inserted into the axial guide pipe 224 of the inner cap part 220, so that the pipe 310 can be moved in the button seat 211 and can guide axial movement of the push button 300.

The push button 300 is elastically biased upwards by a compression spring 350, which is fitted over the coupling pipe 310 and is stopped both by the lower surface of the push button 300 and by the upper surface of the horizontal end plate 223 of the inner cap part 220 at both ends thereof. The coupling pipe 310 has an annular stopper 310*a* at a lower end thereof, so that, when the coupling pipe 310 is elastically moved upwards by the spring 350, the coupling pipe 310 can be stopped by the lower end of the axial guide pipe 224 and the push button 300 can be prevented from being removed from cosmetics vessel.

Here, a guide slot 311 is vertically formed in the sidewall of the push button 300. When the control rod 281 is assembled with the push button 300, the connection part 283 between the seal ring 282 and the contact ring 284 of the control rod 281 is fitted in the guide slot 311.

As shown in FIG. 9 and FIG. 10, the sidewall of the push button 300 having the guide slot 311 is provided with a guide contact part 312, which is a part inclined inwards and upwards. When the push button 300 is in an uppermost position, the inclined front surface of the contact ring 284 of the control rod 281 is in close contact with the inner surface of an inward inclined portion of the guide contact part 312.

The length and diameter of the connection part 283, which is defined between the seal ring 282 and the contact ring 284 of the control rod 281, are determined to be equal to the thickness of the sidewall having the guide slot 311 and the width of the guide slot 311, respectively. Thus, when the push button 300 is moved upwards or downwards, the control rod 281 can be stably moved with the connection part 283 guided by the guide contact part 312 of the guide slot 311.

Figure 11:
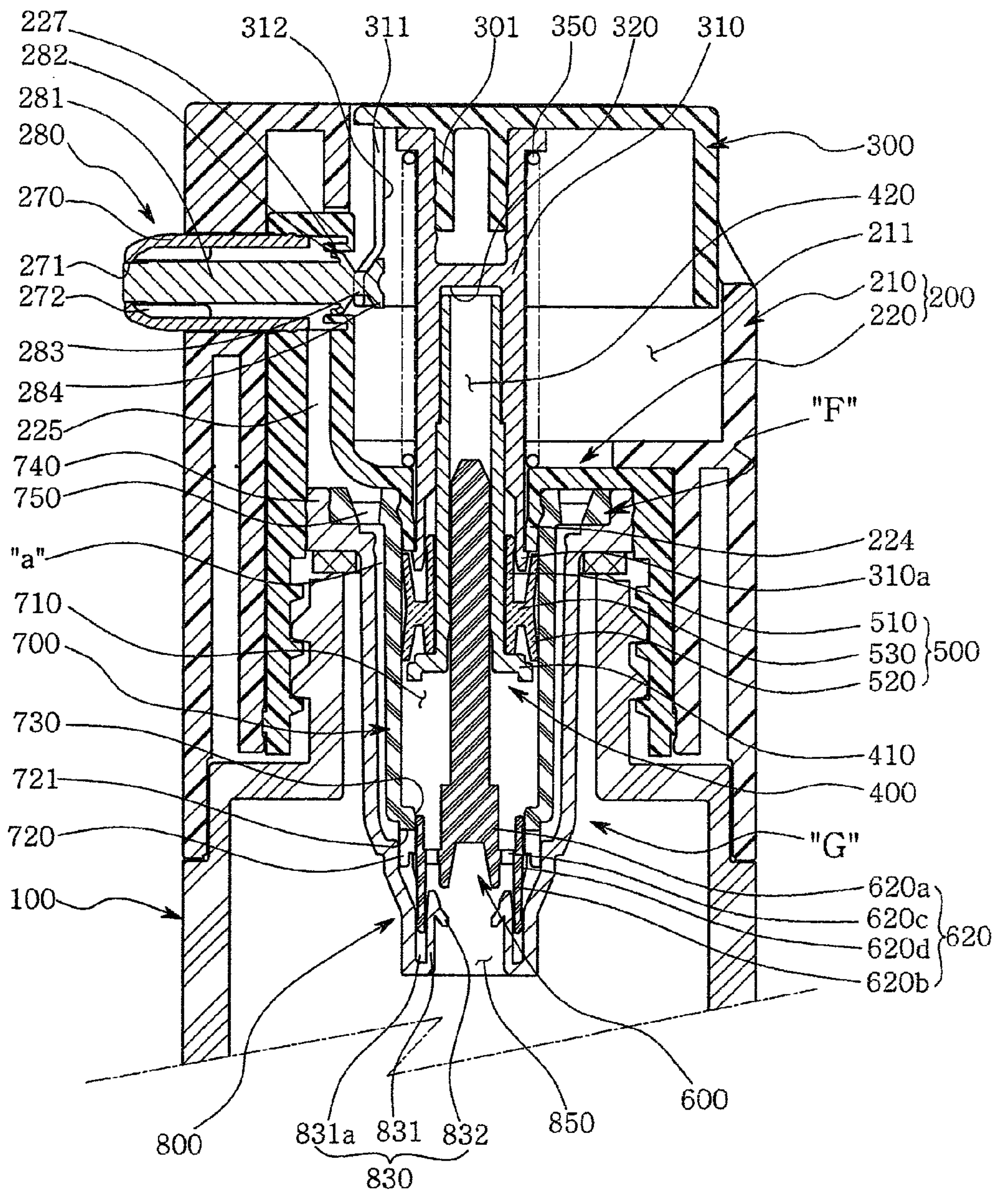
FIG. 11 is an enlarged sectional view of a part of FIG. 8.

As shown in the sectional views of FIG. 8 and FIG. 11, the coupling pipe 310 has a stepped locking bore 320 comprising a small-diameter bore part defined in the upper part of the bore 320 and a large-diameter bore part defined in the lower part of the bore 320. The piston rod 400 is tightly fitted into the small-diameter bore part of the locking bore 320, thus being locked thereto.

The coupling of the piston rod 400 to the coupling pipe 310 is realized by the engagement between a locking groove formed around the outer surface of the piston rod 400 and a locking ring formed on the inner surface of the coupling pipe 310.

The piston unit 450 comprises the piston rod 400 and the piston 500, which is fitted over the piston rod 400 such that the piston 500 can be moved along the piston rod 400 in an axial direction.

The piston rod 400 is a hollow rod having both a flange 410 and a valve guide hole 420. The flange 410 is provided around the lower end of the outer circumferential surface of the piston rod 400. The valve guide hole 420 is axially formed through the piston rod 400 from the lower end to the upper end of the rod 400, with a friction ring 420*a* provided around the inner circumferential surface of the valve guide hole 420 at a predetermined location.

The piston 500 is fitted over the piston rod 400 such that the piston 500 can be moved along the piston rod 400 in the axial direction. During movement of the piston 500 along the piston rod 400, downward movement of the piston 500 is stopped by the flange 410 of the piston rod 400, so that the piston 500 can be prevented from being removed downwards from the piston rod 400. Further, upward movement of the piston 500 is stopped by the lower end of the axial guide pipe 224 of the inner cap part 220 of the discharge cap 200 (see FIG. 12).

The piston 500 comprises an inner ring 510, an outer ring 520 and a connection web 530, which connects the middle portions of the inner and outer circumferential surfaces of the inner and outer rings 510 and 520 to each other. The outer circumferential surface of the outer ring 520 is curved inwards around the middle portion thereof, thus forming a concaved surface. The concaved structure of the outer circumferential surface of the outer ring 520 increases airtightness at the junction between the outer circumferential surface of the outer ring 520 and the inner circumferential surface of the cylinder chamber 710 of the cylinder 700 during axial movement of the piston 500.

The piston 500 is movably fitted over the piston rod 400 such that the piston 500 can axially move within a predetermined range between the lower end of the coupling pipe 310 and the flange 410 of the piston rod 400.

In other words, the upper end of the outer ring 510 of the piston 500 is stopped by the lower end of the axial guide pipe 224, so that upper movement of the piston 500 can be controlled. Further, the upper end of the inner ring 520 is placed in an annular space defined between the outer circumferential surface of the piston rod 400 and the inner circumferential surface of the large-diameter bore part of the locking bore 320 of the coupling pipe 310. Thus, the piston 500 can be prevented from being moved downwards until the lower end of the coupling pipe 310 operated in conjunction with the push button 300 comes into contact with the upper surface of the connection web 530, which connects the inner and outer rings 510 and 520 to each other.

The above-mentioned limitations in the axial movement of the piston 500 are intended to realize the compressive discharge of the cosmetic executed by downward movement of the piston 500 and the suction of the cosmetic executed by upward movement of the piston 500 after an axial valve 600, which will be described later herein, opens or closes the inlet end of a guide passage "a", which is defined between the lower end of the cylinder chamber 710 of the cylinder 700 and the cylinder bushing 800 and extends to the discharge passage 225.

Figure 13:
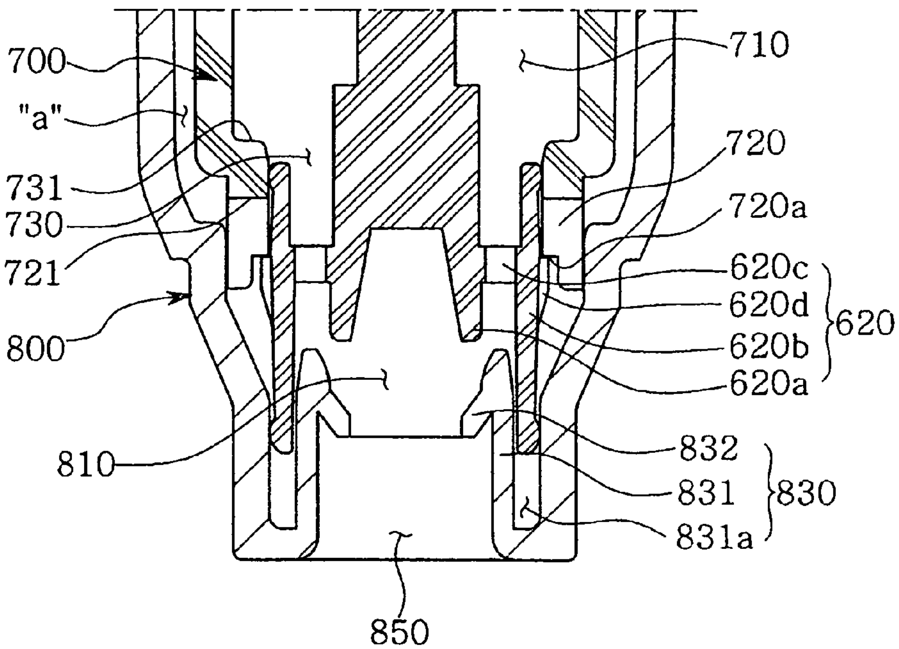
FIG. 13 is an enlarged sectional view of the portion G shown in FIG. 11.

As shown in the enlarged sectional view of FIG. 13, the axial valve 600 comprises a valve stem 610, which is inserted into the valve guide hole 420 of the piston rod 400, and a valve body 620, which is provided at the lower end of the valve stem 610.

Figure 12:
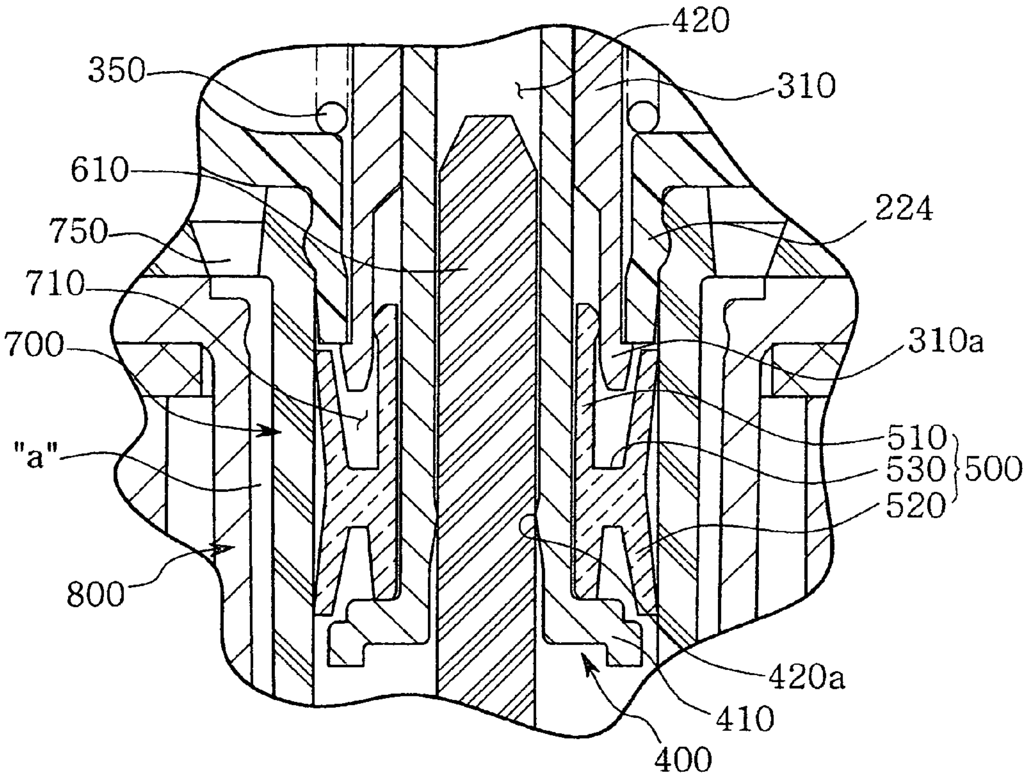
FIG. 12 is an enlarged sectional view of the portion F shown in FIG. 11.

As shown in the enlarged view of FIG. 12, the axial valve 600 can be moved upwards and downwards by frictional contact between the outer circumferential surface of the valve stem 610 and the friction ring 420*a* formed around the inner circumferential surface of the valve guide hole 420 of the piston rod 400.

The valve body 620 comprises an inner valve hub 620*a* and an outer valve ring 620*b*, which are concentrically spaced apart from each other and are connected to each other by a plurality of radial connection ribs 620*c*. Radial openings are defined between the radial connection ribs 620*c* and allow the gel type cosmetic to flow through the valve body 620 in an axial direction.

Further, a stop protrusion 620*d* is formed on the outer circumferential surface of the outer valve ring 620*b*.

The cylinder 700 is provided with an upper flange 740. The upper flange 740 is formed around the upper end of the outer circumferential surface of the cylinder 700. A plurality of discharge holes 750 are formed through the upper flange 740 such that the holes 750 communicate with the discharge passage 225 of the discharge cap 200. The lower end of the cylinder 700 is provided with a small-diameter pipe 720, which extends downwards from an internal step shoulder 731 and defines a suction port 730 therein.

The small-diameter pipe 720 of the cylinder 700 is a pipe, which has a step 720*a* on the inner circumferential surface thereof and is repeatedly, axially notched around the lower end thereof, thus defining a plurality of openings 721 spaced apart from each other at regular intervals.

The upper end of the cylinder chamber 710 of the cylinder 700 is closely fitted over the axial guide pipe 224 of the inner cap part 220.

Further, the outer valve ring 620*b* of the axial valve 600 is inserted into the suction port 730 of the cylinder 700 such that the outer valve ring 620*b* is in close contact with the inner circumferential surface of the suction port 730 and can be moved within a predetermined range in an axial direction.

Here, when the axial valve 600 is moved upwards, the stop protrusion 620*d* of the outer valve ring 620*b* is stopped by the step 720*a*, so that the upward movement of the axial valve 600 can be limited. In the above state, the outer valve ring 620*b* closes the openings 721. However, when the axial valve 600 is moved downwards, the openings 721 are opened. In the above state, the piston 500 is moved downwards and compresses the cosmetic in the cylinder chamber 710, thus discharging the cosmetic from the cylinder chamber 710 through the openings 721 until the lower end of the flange 410 of the piston rod 400 comes into contact with the internal step shoulder 731 of the small-diameter pipe 720 of the cylinder 700.

In other words, the axial valve 600 is moved downwards and upwards, so that the valve 600 can open and close the guide passage "a" defined between the cylinder 700 and an internal chamber 810 of the cylinder bushing 800.

The cylinder bushing 800 has a locking flange 820 around the upper end thereof and is fitted into the inner circumferential surface of the threaded pipe part 221 of the inner cap part 220 at the locking flange 820. In the above state, the upper flange 740 of the cylinder 700 is received in the upper end of the internal chamber 810 inside the locking flange 820 such that the guide passage "a" is defined between the cylinder bushing 800 and the outer circumferential surface of the cylinder 700.

The cylinder bushing 800 further includes a stepped bottom pipe 830, which extends downwards from the internal chamber 810. The stepped bottom pipe 830 is closely fitted over the outer circumferential surface of the small-diameter pipe 720 of the cylinder 700, thus maintaining a predetermined width of the guide passage "a". The stepped bottom pipe 830 also has an internal ring 831, which extends upwards from the lower end of the stepped bottom pipe 830 while defining an annular guide groove 831*a*, and receives the valve body 620 of the axial valve 600 in the annular guide groove 831*a*. In other words, the stepped bottom pipe 830 receives the lower end of the outer valve ring 620*b* in the annular guide groove 831*a* such that the outer valve ring 620*b* can be moved upwards and downwards within a predetermined range. The stepped bottom pipe 830 further includes a control seat 832, which extends inwardly from the upper end of the internal ring 831. When the inner valve hub 620*a* has been moved downwards to the lowermost position, the lower end of the inner valve hub 620*a* comes into close contact with the control seat 832, thus closing a cosmetic inlet port 850 of the cylinder bushing 800.

In other words, the outer valve ring 620*b* of the axial valve 600 is fitted at the upper portion thereof into the small-diameter pipe 720 of the cylinder 700 and is fitted at the lower portion thereof into the annular guide groove 831*a*, which is defined by the internal ring 831 of the cylinder bushing 800. In the above state, the outer valve ring 620*b* can be moved downwards and upwards within the predetermined range, thus opening and closing the guide passage "a" defined between the cylinder 700 and the cylinder bushing 800.

When the inner valve hub 620*a* is moved upwards and downwards, the valve hub 620*a* can be seated on the control seat 832 of the internal ring 831 of the stepped bottom pipe 830, thus opening or closing the cosmetic inlet port 850 of the cylinder bushing 800.

A seal ring "P" is fitted over the outer circumferential surface of the cylinder bushing 800 at a location below the locking flange 820. When the threaded pipe part 221 of the inner cap part 220 is tightened to the externally threaded mouth of the vessel body 100, the mouth of the vessel body 100 can communicate with the interior of the discharge cap 200 in a state in which the interior of the vessel body 100 is airtightly sealed from the atmosphere by the seal ring "P".

The operation of the cosmetics vessel according to the present invention will be described hereinbelow.

FIG. 11 shows a state in which the push button 300 is in an initial position or the cosmetic has moved into the cylinder 700. When the pushing force is removed from the push button 300 after the push button 300 had been pushed downwards, the piston rod 400 of the piston unit 450, which is assembled with the coupling pipe 310 of the push button 300, is elastically moved upwards by the restoring force of the compression spring 350.

When the piston rod 400 is elastically moved upwards as described above, the axial valve 600 concentrically coupled to the piston rod 400 is primarily moved upwards, so that the valve body 620 closes the guide passage "a" defined between the cylinder 700 and the cylinder bushing 800 and, at the same time, opens the cosmetic inlet port 850 of the cylinder bushing 800.

Described in detail, the piston rod 400 of the piston unit 450 can be elastically moved upwards by the restoring force of the compression spring 350 elastically biasing the push button 300 upwards in a state in which the lower end of the piston 500 is in contact with the upper surface of the flange 410. In the above state, the valve stem 610 of the axial valve 600, which is fitted into the valve guide hole 420 of the piston rod 400, can be moved upwards by frictional contact between the outer circumferential surface of the valve stem 610 and the friction ring 420*a* formed in the valve guide hole 420.

In other words, when the axial valve 600 is moved upwards, the outer valve ring 620*b* of the valve body 620 is moved upwards and closes the guide passage "a" and, at the same time, the inner valve hub 620*a*, which has been in contact with the control seat 832 of the cylinder bushing 800 and has closed the cosmetic inlet port 850, is moved upwards, thus opening the cosmetic inlet port 850.

In the above state, the stop protrusion 620*d*, which protrudes on the outer circumferential surface of the outer valve ring 620*b*, is stopped by the step 720*a* of the small-diameter pipe 720 of the cylinder 700, so that the upper end of the outer valve ring 620*b* is inserted into the suction port 730 of the cylinder 700 and is moved upwards, thus closing the radial openings 721 of the small-diameter pipe 720. Therefore, the guide passage "a" is closed (see FIG. 13).

Due to the upward movement of the push button 300, the piston rod 400 secondarily moves the piston 500 upwards inside the cylinder 700.

When the piston 500 is moved upwards inside the cylinder 700, the piston 500 is put in close contact with the inner circumferential surface of the cylinder chamber 710, thus creating a suction force in the chamber 710. Therefore, a predetermined amount of cosmetic "c" is introduced from the vessel body 100 into the cylinder chamber 710 sequentially through the cosmetic inlet port 850 of the cylinder bushing 800, the openings defined between the connection ribs 620*c* connecting the inner valve hub 620*a* and the outer valve ring 620*b* of the valve body 620, and the suction port 730 of the cylinder 700.

In the above state, the control nozzle 280, which communicates with the discharge passage 225 of the discharge cap 200, is maintained in a closed state.

In other words, the control nozzle 280 is closed by force during the upward movement of the push button 300.

In the above state, the control rod 281 of the control nozzle 280, which has the connection part 283 formed between the seal ring 282 and the contact ring 284 and is movably inserted in the guide slot 311 of the push button 300, remains in the fully ejected state in which the inclined front surface of the contact ring 284 is in close contact with the inner surface of the inward inclined portion of the guide contact part 312 defining the guide slot 311. Thus, the front end of the control rod 281 closes the discharge port 271 of the nozzle pipe 270.

When the push button 300 is pushed downwards, the cosmetic can be discharged from the cylinder chamber 710 of the cylinder 700 which is under pressure.

Figure 14:
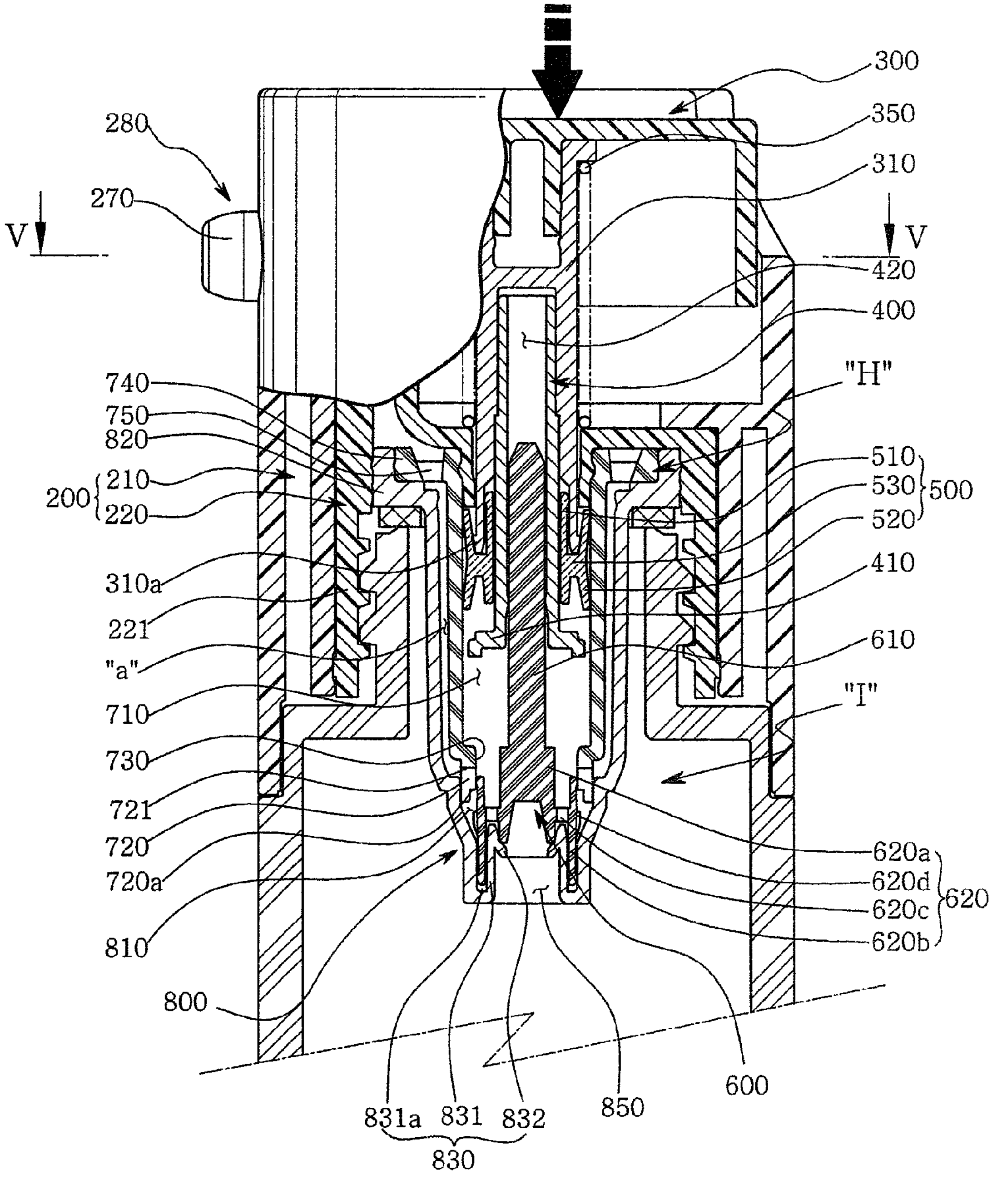
FIG. 14 is a sectional view showing operation of the present invention, in which the axial valve has been moved downwards by a primary downward movement of the push button to a middle position, thus closing a cosmetic inlet port of the cylinder bushing.

FIG. 14 shows a state in which the axial valve 600 is primarily moved downwards by initial downward movement of the push button 300, thus closing the cosmetic inlet port 850 of the cylinder bushing 800.

When the push button 300 is moved downwards, the piston rod 400, which is fitted into the locking bore 320 of the coupling pipe 310, is moved downwards.

Therefore, the axial valve 600 is primarily moved downwards due to frictional contact between the valve 600 and the friction ring 420*a* formed on the inner circumferential surface of the valve guide hole 420 of the piston rod 400.

Figure 16:
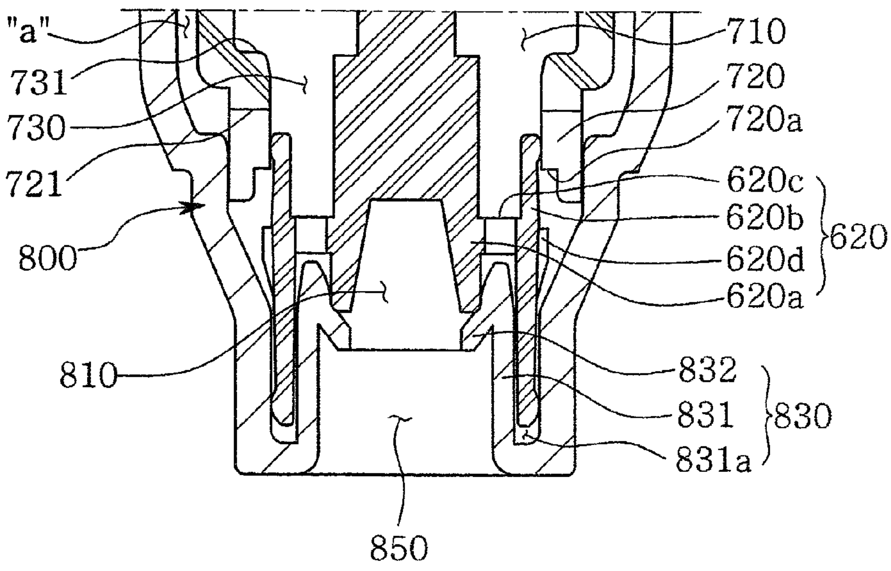
FIG. 16 is an enlarged sectional view of the portion I shown in FIG. 14.

Due to the primary downward movement of the axial valve 600, the outer valve ring 620*b* of the valve body 620 is moved downwards into the annular guide groove 831*a* of the cylinder bushing 800, so that the openings 721 of the small-diameter pipe 720 are opened and the guide passage "a" defined between the cylinder 700 and the cylinder bushing 800 is opened, as shown in FIG. 16. Further, the inner valve hub 620*a* is seated onto the control seat 832 of the cylinder bushing 800, thus closing the cosmetic inlet port 850.

Figure 15:
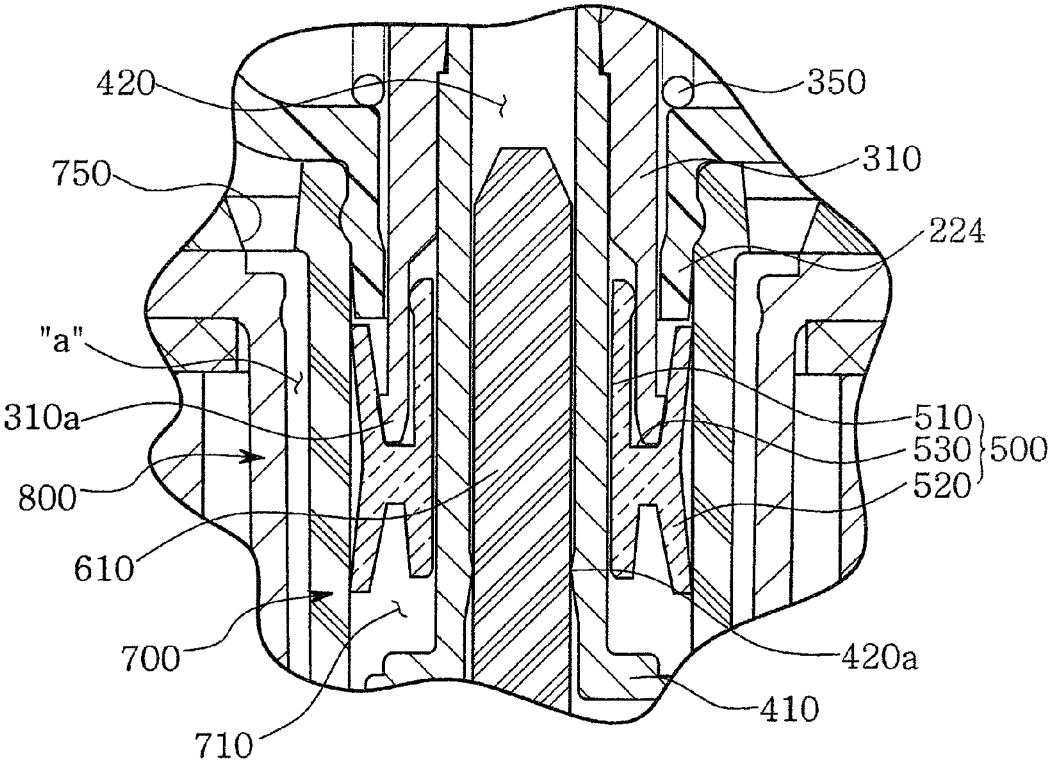
FIG. 15 is an enlarged sectional view of the portion H shown in FIG. 14.

As shown in FIG. 15, the annular stopper 310*a* formed around the lower end of the coupling pipe 310 assembled with the push button 300 is in contact with the upper surface of the connection web 530, which is formed between the inner ring 510 and the outer ring 520 of the piston 500. Here, the piston 500 is movably fitted over the piston rod 400.

Figure 17:
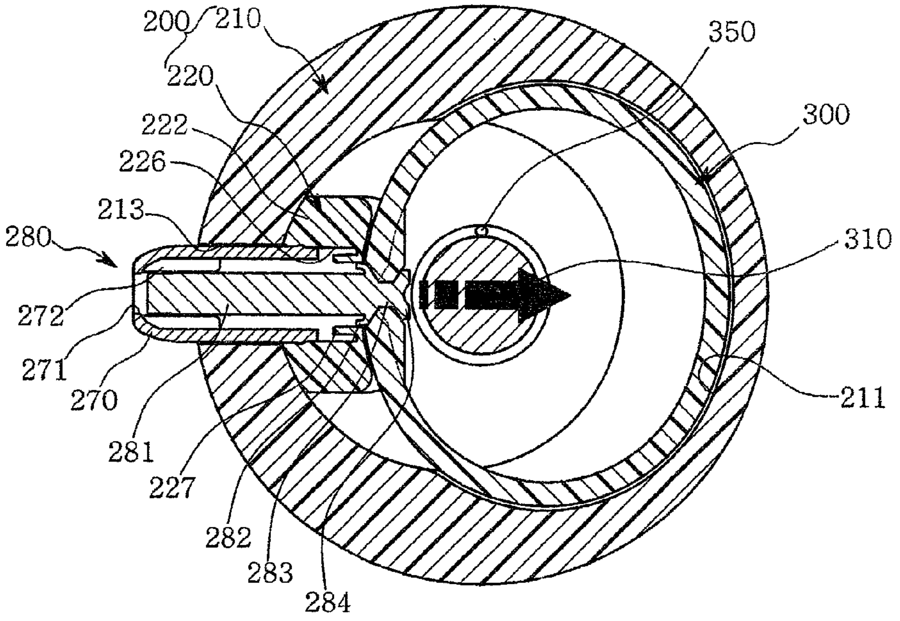
FIG. 17 is a sectional view taken along line V-V of FIG. 14.
Figure 18:
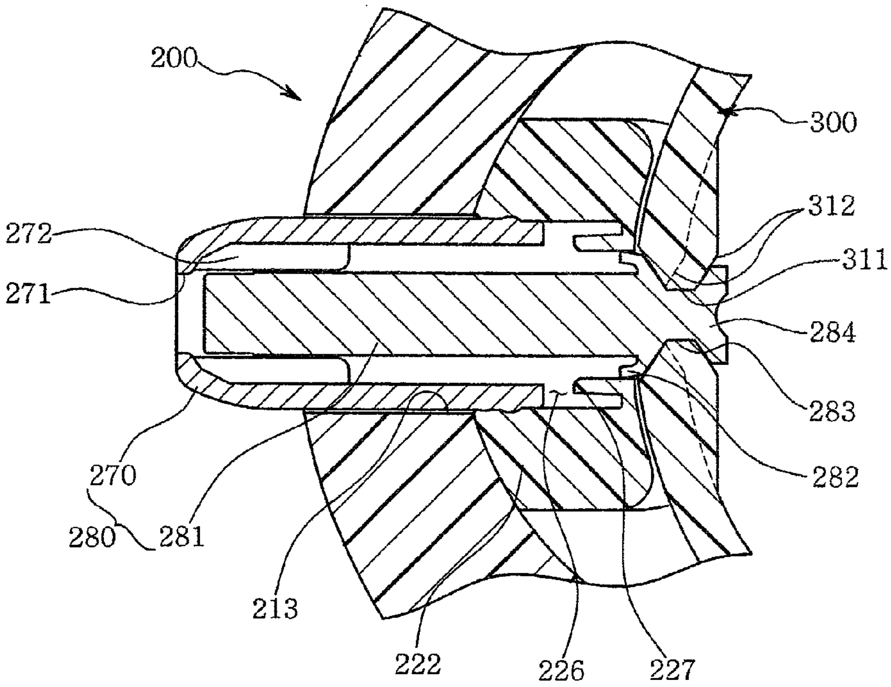
FIG. 18 is an enlarged sectional view of a part of FIG. 17.

As shown in FIG. 17 and FIG. 18, when the push button 300 is pushed downwards, the guide contact part 312 of the push button 300 is moved downwards, so that the contact ring 284 of the control rod 281 movably fitted into the guide slot 311 of the push button 300 is moved backwards by the inward inclined portion of the guide contact part 312. Therefore, the discharge port 271 of the nozzle pipe 270 of the control nozzle 280 is opened.

In other words, when the push button 300 is moved downwards, the control rod 281 of the control nozzle 280 is moved backwards. In the above state, the contact ring 284 is guided by the guide slot 311 and is located on the inner surface of an upper vertical portion extending upwards from the inward inclined portion of the guide contact part 312. Thus, the discharge port 271 of the nozzle pipe 270 is opened.

When the push button 300 is further pushed downwards to the lowermost position, the piston 500 is secondarily moved downwards and discharges the cosmetic "c" from the cylinder chamber 710 of the cylinder 700 through the control nozzle 280.

Figure 19:
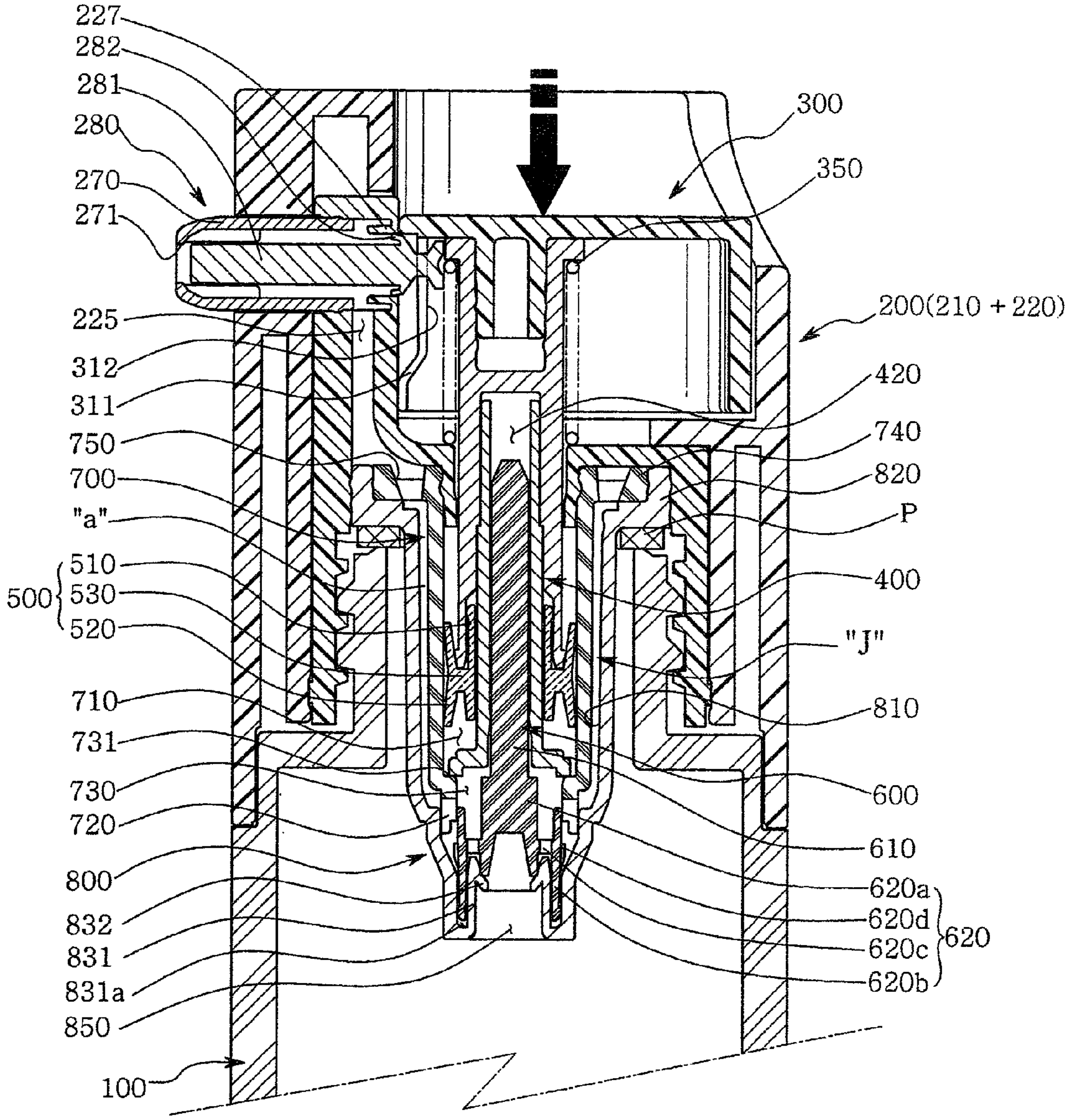
FIG. 19 is a sectional view showing operation of the present invention, in which the piston has been moved downwards to a lowermost position by a secondary downward movement of the push button to a lowermost position, thus compressing the cosmetic in the cylinder chamber and discharging the cosmetic from the chamber through a control nozzle.
Figure 20:
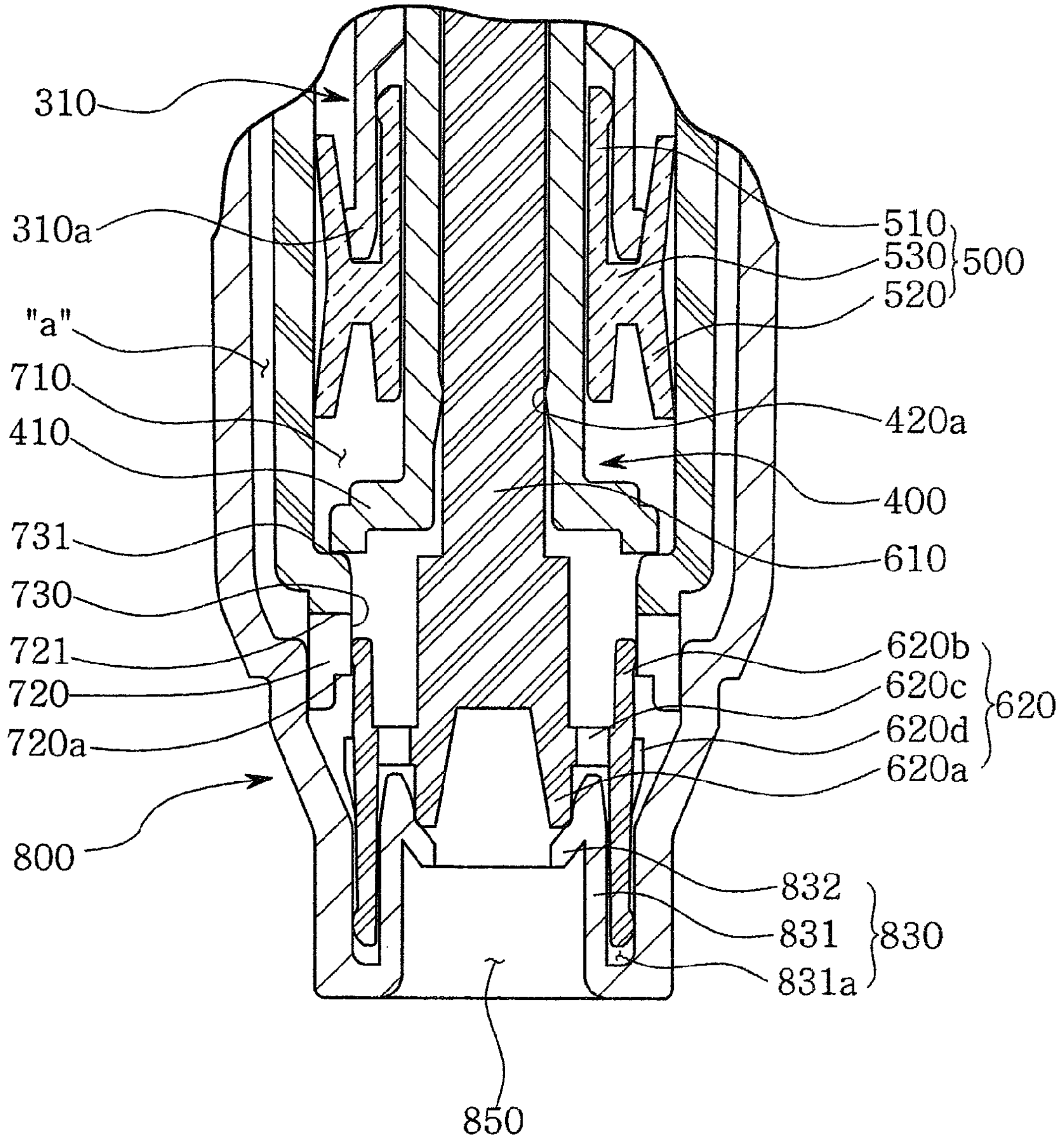
FIG. 20 is an enlarged sectional view of the portion J shown in FIG. 17.

FIG. 19 shows a state in which the push button 300 is fully pushed downwards and the piston 500 is further moved downwards to the lowermost position, thus compressing the cosmetic "c" in the cylinder chamber 710 and discharging the cosmetic "c" through the control nozzle 280. FIG. 20 is an enlarged view of FIG. 19.

When the push button 300 is pushed further downwards, the piston 500 is secondarily moved downwards by force just before the lower end of the flange 410 of the piston rod 400 comes into contact with the internal step shoulder 731 of the small-diameter pipe 720 of the cylinder 700.

During the secondary downward movement of the piston 500, the piston 500 is put in close contact with the inner circumferential surface of the cylinder chamber 710 of the cylinder 700, thus compressing the cosmetic "c" in the cylinder chamber 710 and discharging a predetermined amount of cosmetic "c" sequentially through the suction port 730, the openings 721 of the small-diameter pipe 720, the guide passage "a", the discharge passage 750, the discharge passage 225 of the discharge cap 200, and the discharge port 271 of the nozzle pipe 270 of the control nozzle 280.

Described in brief, during the operation of the cosmetics vessel according to the present invention, the push button 300 is pushed downwards and is elastically moved upwards, thus sucking and discharging a cosmetic "c". During the operation, the piston rod 400 and the piston 500 of the piston unit 450 and the axial valve 600 movably coupled to the piston rod 400 are sequentially moved, thus realizing a precise operation without malfunctioning. The control nozzle 280 is opened and closed in conjunction with operation of other parts, so that it is possible to prevent the cosmetic from leaking after the cosmetics vessel has been used. Thus, the present invention prevents the cosmetics vessel from being contaminated when a user is carrying the vessel, and prevents the cosmetic "c" contained in nozzle pipe 270 from making contact with the air, thus preventing the quality of the cosmetic from changing.

What is claimed is:

1. An airless type cosmetics vessel comprising: a discharge cap mounted to the vessel body and defining a discharge passage therein and receiving a control nozzle in the discharge passage, a push button placed in the discharge cap so as to move upwards and downwards and elastically biased upwards by a compression spring, a cylinder mounted to the discharge cap, a piston unit axially connected to the push button and being movable upwards or downwards so as to suck a cosmetic from the vessel body into the cylinder and to discharge the cosmetic from the cylinder through the discharge passage, and a cylinder bushing mounted to the discharge cap and receiving the cylinder therein and defining a guide passage communicating with the discharge passage and having a cosmetic inlet port in a lower end thereof, wherein the discharge cap comprises: an outer cap part and an inner cap part placed inside the outer cap part, wherein the outer cap part includes: a button seat formed in an upper portion of the upper cap part; a coupling pipe extending downwards through the button seat; and a nozzle installation hole formed through the button seat in horizontal direction; and the inner cap part includes: a threaded pipe part mounted to the coupling pipe of the outer cap part; a support piece part extending upwards from a part of an upper end of the threaded pipe part and passing through and assembled with the button seat such that the support piece part is in close contact with an inner surface of the nozzle installation hole, the support piece part being hollow and having the discharge passage communicating with an interior of the threaded pipe part, with an airtight nozzle hole formed through the support piece part such that the airtight nozzle hole reaches the button seat and is aligned with the nozzle installation hole; and an axial guide pipe extending downwards from a horizontal end plate of the threaded pipe part;

the control nozzle is installed both through the nozzle installation hole and through the airtight nozzle hole such that the control nozzle reaches the button seat; and the piston unit comprises: a piston rod connected to a coupling pipe coupled to the push button; and a piston coupled to the piston rod and moved upwards and downwards between the coupling pipe and the piston rod, wherein the piston rod movably receives therein an axial valve, the axial valve comprising a valve stem and a valve body provided at a lower end of the valve stem so as to open or close the guide passage, wherein when the push button is moved upwards, the axial valve is primarily moved upwards, so that the valve body closes the guide passage and, at the same time, opens the cosmetic inlet port of the cylinder bushing, and the piston rod is secondarily moved upwards, thus sucking the cosmetic into a cylinder chamber; and when the push button is pushed downwards, the axial valve is moved downwards, so that the valve body closes the cosmetic inlet port of the cylinder bushing and opens the guide passage, and the piston rod is secondarily moved downwards, so that the piston coupled to the piston rod compresses the cylinder chamber and the cosmetic is discharged from the cylinder chamber through the discharge passage after passing through the guide passage and the discharge passage.

2. The airless type cosmetics vessel as set forth in claim 1, wherein the piston rod is a hollow rod having both a flange provided around a lower end of an outer circumferential surface of the piston rod and a valve guide hole axially formed through the piston rod upwards, with a friction ring provided around an inner circumferential surface of the valve guide hole at a predetermined location; and the piston is stopped by the flange and by the lower end of the axial guide pipe of the inner cap part, so that upward and downward movement of the piston can be limited.

3. The airless type cosmetics vessel as set forth in claim 1 or 2, wherein the piston comprises an inner ring, an outer ring and a connection web connecting middle portions of inner and outer circumferential surfaces of the inner and outer rings to each other, the outer circumferential surface of the outer ring being curved inwards around the middle portion thereof, thus increasing airtightness at a junction between the outer circumferential surface of the outer ring and the inner circumferential surface of the cylinder chamber during axial movement of the piston, and the piston is movably fitted over the piston rod such that the piston can axially move within a predetermined range between the lower end of the coupling pipe and the flange of the piston rod.

4. The airless type cosmetics vessel as set forth in claim 3, wherein the upper end of the outer ring of the piston is stopped by the lower end of the axial guide pipe, so that upward movement of the piston can be limited, and the piston can be prevented from being moved downwards until the lower end of the coupling pipe operated in conjunction with the push button comes into contact with the upper surface of the connection web connecting the inner and outer rings to each other.

5. The airless type cosmetics vessel as set forth in claim 1, wherein the valve body of the axial valve comprises an inner valve hub and an outer valve ring concentrically spaced apart from each other and connected to each other by a plurality of radial connection ribs, with a stop protrusion formed on an outer circumferential surface of the outer valve ring, and the cylinder is closely fitted over the axial guide pipe of the inner cap part at an upper end of the cylinder chamber, with an upper flange formed around an upper end of the outer circumferential surface of the cylinder and a plurality of discharge holes formed through the upper flange such that the discharge holes communicate with the discharge passage of the discharge cap, and the lower end of the cylinder is provided with a small-diameter pipe, which extends downwards from an internal step shoulder and defines a suction port therein and has a step on the inner circumferential surface thereof and is repeatedly, axially notched around the lower end thereof, thus defining a plurality of radial openings, and the outer valve ring of the axial valve is inserted into the suction port of the cylinder such that the outer valve ring is in close contact with an inner circumferential surface of the suction port and can be moved within a predetermined range in an axial direction.

6. The airless type cosmetics vessel as set forth in claim 5, wherein, when the axial valve is moved upwards, the stop protrusion of the outer valve ring is stopped by the step, so that the upward movement of the axial valve can be limited and the outer valve ring closes the openings, and when the axial valve is moved downwards, the openings are opened by the outer valve ring and the piston is moved downwards and compresses the cosmetic in the cylinder chamber, thus discharging the cosmetic from the cylinder chamber through the openings until the lower end of the flange of the piston rod comes into contact with the internal step shoulder of the small-diameter pipe of the cylinder.

7. The airless type cosmetics vessel as set forth in claim 1 or 5, wherein the cylinder bushing comprises:

a locking flange formed around the upper end of the cylinder bushing and fitted into the inner circumferential surface of the threaded pipe part of the inner cap part, with the upper flange of the cylinder received in an upper end of an internal chamber defined inside the locking flange such that the guide passage is defined between the inner circumferential surface of cylinder bushing and the outer circumferential surface of the cylinder; and a stepped bottom pipe extending downwards from the internal chamber and closely fitted over the outer circumferential surface of the small-diameter nine of the cylinder, thus maintaining a predetermined width of the guide passage, the stepped bottom pipe also having an internal ring extending upwards from the lower end of the stepped bottom pipe while defining an annular guide groove and receiving the lower end of the outer valve ring in the annular guide groove such that the outer valve ring can be moved upwards and downwards within a predetermined range, with a control seat extending inwardly from the upper end of the internal ring, so that, when the inner valve hub has been moved downwards to a lowermost position, the lower end of the inner valve hub comes into close contact with the control seat, thus closing the cosmetic inlet port of the cylinder bushing.

8. The airless type cosmetics vessel as set forth in claim 7, wherein the outer valve ring of the axial valve is fitted at an upper portion thereof into the small-diameter pipe of the cylinder and is fitted at a lower portion thereof into the annular guide groove defined by the internal ring of the cylinder bushing, so that the outer valve ring can be moved downwards and upwards within a predetermined range, thus opening and closing the guide passage defined between the cylinder and the cylinder bushing, and the inner valve hub is moved upwards and downwards, thus opening or closing the cosmetic inlet port.

9. The airless type cosmetics vessel as set forth in claim 1, wherein the airtight nozzle hole is provided with an elastic ring, which protrudes from a rear portion of the inner circumferential surface of the nozzle hole.

10. The airless type cosmetics vessel as set forth in claim 1, wherein the control nozzle comprises an outer nozzle pipe installed both through the nozzle installation hole and through the airtight nozzle hole, and a control rod movably received in the nozzle pipe such that the control rod passes through the airtight nozzle hole so as to reach the button seat and can axially move forwards and backwards so as to open or close the discharge port, wherein the control rod comprises an elastic seal ring formed at a rear portion thereof spaced apart by a predetermined distance from a front end that comes into contact with the inner circumferential surface of the discharge port, a connection part extending from the seal ring and having a small diameter, and a contact ring connected to the rear end of the connection part, wherein the control rod is installed in a state in which both the connection part and the contact ring are projected into the button seat.

11. The airless type cosmetics vessel as set forth in claim 1 or 10, wherein the seal ring is closely fitted into the elastic ring of the airtight nozzle hole, thus sealing a junction between the button seat and the discharge passage during movement of the control rod.

12. The airless type cosmetics vessel as set forth in claim 1 or 10, wherein the push button is prevented from being removed upwards by the annular stopper of the coupling pipe caught by the lower end of the axial guide pipe, and is installed in a state in which the connection part of the control rod is fitted into the guide slot having a guide contact part provided with an upward inclined inner surface, so that, in response to upward and downward movement of the push button, the control rod is moved forwards and backwards in a state in which the seal ring and the contact ring of the control rod are in close contact with the guide contact part, thus closing and opening the discharge port of the nozzle pipe.

* * * * *